United States Patent
Chiu et al.

(10) Patent No.: US 10,368,043 B2
(45) Date of Patent: Jul. 30, 2019

(54) PROJECTOR AND ILLUMINATION SYSTEM THEREOF

(71) Applicant: Coretronic Corporation, Hsin-Chu (TW)

(72) Inventors: Hao-Wei Chiu, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/154,696

(22) Filed: Oct. 8, 2018

(65) Prior Publication Data

US 2019/0110030 A1 Apr. 11, 2019

(30) Foreign Application Priority Data

Oct. 9, 2017 (CN) .................... 2017 2 1288849 U

(51) Int. Cl.
| | |
|---|---|
| *G03B 21/20* | (2006.01) |
| *H04N 9/31* | (2006.01) |
| *G03B 21/14* | (2006.01) |
| *G02B 27/10* | (2006.01) |

(52) U.S. Cl.
CPC ....... *H04N 9/3152* (2013.01); *G02B 27/1006* (2013.01); *G03B 21/142* (2013.01); *G03B 21/204* (2013.01); *G03B 21/2066* (2013.01); *H04N 9/3158* (2013.01)

(58) Field of Classification Search
CPC .............. G03B 21/204; G03B 21/2033; G03B 21/2013; G03B 21/2066; H04N 9/3158; H04N 9/3161; H04N 9/3164
See application file for complete search history.

(56) References Cited

U.S. PATENT DOCUMENTS

| | | | |
|---|---|---|---|
| 2013/0250253 A1 | 9/2013 | Ogura | |
| 2013/0322056 A1 | 12/2013 | Konuma et al. | |
| 2014/0240677 A1 | 8/2014 | Hu et al. | |
| 2015/0222864 A1 | 8/2015 | Inoko | |
| 2015/0362830 A1* | 12/2015 | Liao ..................... | G03B 21/204 353/31 |
| 2018/0157050 A1* | 6/2018 | Liao ........................ | G02B 27/10 |

* cited by examiner

*Primary Examiner* — Ryan D Howard

(57) ABSTRACT

A projector includes an illumination system, an optical engine module and a projection lens. The illumination system includes an excitation light source group, a wavelength conversion element and a light combining element. A first light emitting element provides a first beam. The wavelength conversion element has a reflective area and a wavelength conversion area, which cut into the transmission path of the first beam by turns. The light combining element is disposed between the excitation light source group and the wavelength conversion element and has at least one first dichroic portion, at least one first reflective portion, and a first light combining surface facing the first light emitting element. The first dichroic portion and the first reflective portion correspond to the first and the third quadrant of the first light combining surface respectively. The projector and the illumination system have the advantages of lower cost and smaller size.

23 Claims, 21 Drawing Sheets

US 10,368,043 B2

PROJECTOR AND ILLUMINATION SYSTEM THEREOF

CROSS-REFERENCE TO RELATED APPLICATION

THIS APPLICATION CLAIMS THE PRIORITY BENEFIT OF CHINA APPLICATION (CN201721288849.9 FILED ON 2017 Oct. 9). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to an illumination system, and more particularly to an illumination system for a projector.

BACKGROUND OF THE INVENTION

Digital light processing (DLP) projection devices include an illumination system, a digital micro-mirror device (DMD) and a projection lens. The illumination system is used to provide an illumination beam, the digital micro-mirror device is used to convert the illumination beam into an image beam, and the projection lens is used to project the image beam onto the screen to form an image frame on the screen. Ultra-high pressure mercury lamps are commonly used as light sources for early illumination systems and are for providing white light as the illumination beam. With the development of illumination technology, light sources such as light emitting diode light sources and laser light sources with the advantages of energy saving have also been gradually adopted.

However, a large number of optical components are needed to be configured when the architecture of the illumination system is complex, which leads to problems such as high cost, large size and poor optical efficiency.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide a projector which has the advantages of lower cost and smaller size.

Another objective of the invention is to provide an illumination system to reduce the number of optical components, thereby reducing the cost and size.

Other objectives and advantages of the invention can be further understood from the technical features disclosed in the invention.

In order to achieve one or a part or all of the above objectives or other objectives, the invention provides a projector, which includes an illumination system, a light engine module and a projection lens. The illumination system includes an excitation light source group, a wavelength conversion element and a light combining element. The excitation light source group includes at least one first light emitting element. The first light emitting element is configured to provide a first beam. The wavelength conversion element has a reflective area and a wavelength conversion area. The reflective area and the wavelength conversion area are configured to cut into a transmission path of the first beam by turns. The light combining element is disposed between the excitation light source group and the wavelength conversion element and has at least one first dichroic portion, at least one first reflective portion, and a first light combining surface facing the first light emitting element. The first dichroic portion corresponds to a first quadrant of the first light combining surface and the first reflective portion corresponds to a third quadrant of the first light combining surface. The first beam is configured to penetrate through the first dichroic portion and to be transmitted to the wavelength conversion element. The reflective area is configured to reflect the first beam to the first reflective portion. The wavelength conversion area is configured to convert the first beam into an excited beam and reflect the excited beam to the light combining element. The first dichroic portion and the first reflective portion of the light combining element are configured to reflect the excited beam, and the first reflective portion of the light combining element is configured to reflect the first beam from the reflective area, so that the first beam and the excited beam constitute an illumination beam. The light engine module includes a light valve. The light valve is located on a transmission path of the illumination beam and is configured to convert the illumination beam into an image beam. The projection lens is located on a transmission path of the image beam. The image beam becomes a projection beam after passing through the projection lens.

In order to achieve one or a part or all of the above objectives or other objectives, the invention provides an illumination system, which includes an excitation light source group, a wavelength conversion element and a light combining element. The excitation light source group includes at least one first light emitting element. The first light emitting element is configured to provide a first beam. The wavelength conversion element has a reflective area and a wavelength conversion area. The reflective area and the wavelength conversion area are configured to cut into a transmission path of the first beam by turns. The light combining element is disposed between the excitation light source group and the wavelength conversion element and has at least one first dichroic portion, at least one first reflective portion, and a first light combining surface facing the first light emitting element. The first dichroic portion corresponds to a first quadrant of the first light combining surface and the first reflective portion corresponds to a third quadrant of the first light combining surface. The first beam is configured to penetrate through the first dichroic portion and to be transmitted to the wavelength conversion element. The reflective area is configured to reflect the first beam to the first reflective portion. The wavelength conversion area is configured to convert the first beam into an excited beam and reflect the excited beam to the light combining element. The first dichroic portion and the first reflective portion of the light combining element are configured to reflect the excited beam, and the first reflective portion of the light combining element is configured to reflect the first beam from the reflective area, so that the excited beam and the first beam constitute an illumination beam.

In order to achieve one or a part or all of the above objectives or other objectives, the invention provides a projector, which includes an illumination system, a light engine module and a projection lens. The illumination system includes an excitation light source group, a wavelength conversion element and a light combining element. The excitation light source group includes at least one first light emitting element. The first light emitting element is configured to provide a first beam. The wavelength conversion element has a reflective area and a wavelength conversion area. The reflective area and the wavelength conversion area are configured to cut into a transmission path of the first beam by turns. The light combining element is disposed between the excitation light source group and the wavelength conversion element and has at least one first dichroic portion, at least one first penetrating portion, and a first light combining surface facing the first light emitting element. The first penetrating portion corresponds to a first quadrant of the first light combining surface and the first dichroic portion corresponds to a third quadrant of the first light combining surface. The first beam is adapted to be reflected by the first dichroic portion to the wavelength conversion element. The reflective area is adapted to reflect the first beam to the first penetrating portion. The wavelength conversion area is adapted to convert the first beam into an excited beam and adapted to reflect the excited beam to the light combining element. The first dichroic portion and the first penetrating portion of the light combining element are adapted to allow the excited beam to penetrate therethrough, the first penetrating portion is adapted to allow the first beam and the excited beam to penetrate through, so that the first beam and the excited beam constitute an illumination beam. The light engine module includes a light valve. The light valve is located on a transmission path of the illumination beam and is configured to convert the illumination beam into an image beam. The projection lens is located on a transmission path of the image beam. The image beam becomes a projection beam after passing through the projection lens.

In summary, in the illumination system according to the embodiment of the invention, the light combining element is disposed between the excitation light source group and the wavelength conversion element, and at least one first dichroic portion and at least one first reflective portion of the light combining element respectively correspond to the first quadrant and the third quadrant of the first light combining surface. With this structural design, the effect of simplifying the optical path is effectively achieved and accordingly the number of optical elements of the illumination system can be greatly reduced, thereby reducing the cost, the size, and easily adding an extra supplementary light source. In addition, the projector according to the embodiment of the invention has the advantages of lower cost and smaller size due to the use of the illumination system.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
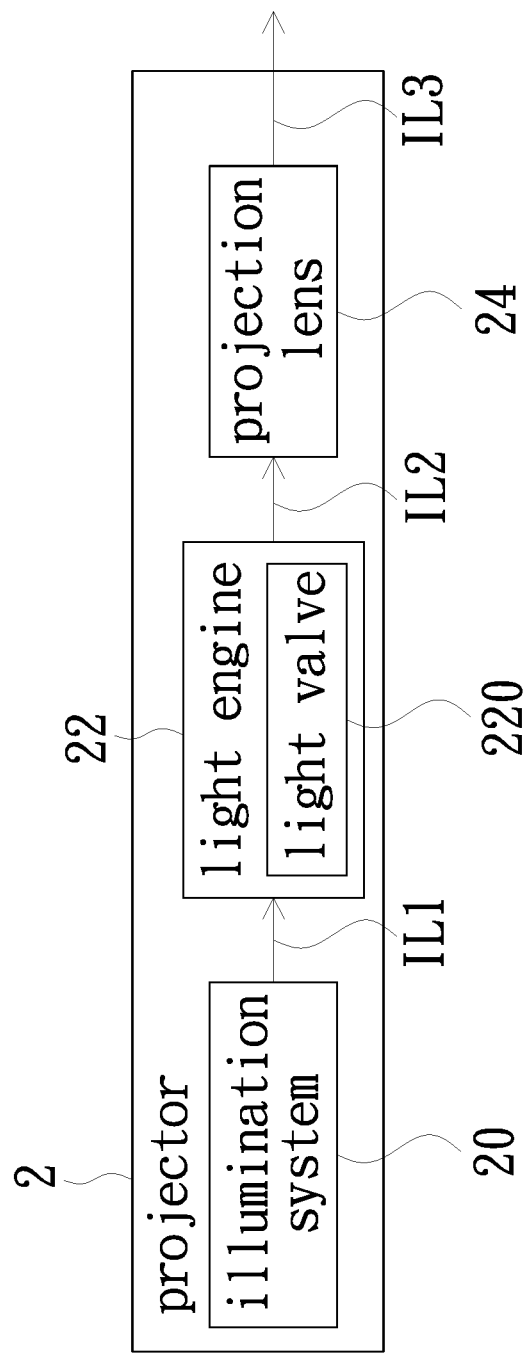
FIG. 1 is a functional block diagram of a projector in accordance with an embodiment of the invention.

FIG. 1 is a functional block diagram of a projector in accordance with an embodiment of the invention. As shown in FIG. 1, the projector 2 in the embodiment includes an illumination system 20, a light engine module 22 and a projection lens 24. The illumination system 20 is configured to provide an illumination beam IL1 The light engine module 22 is located on the transmission path of the illumination beam IL1. The light engine module 22 includes a light valve 220, and the light valve 220 is configured to convert the illumination beam IL1 into an image beam IL2. In the embodiment, the light valve 220 may be a digital micro-mirror device (DMD), a liquid crystal on silicon (LCoS) or a liquid crystal display (LCD), but the invention is not limited thereto. The projection lens 24 is located on the transmission path of the image beam IL2 and becomes a projection beam IL3 when the image beam IL2 passes through the projection lens 24.

The detailed structure of the illumination system 20 of the embodiment will be further described below.

Figure 2A:
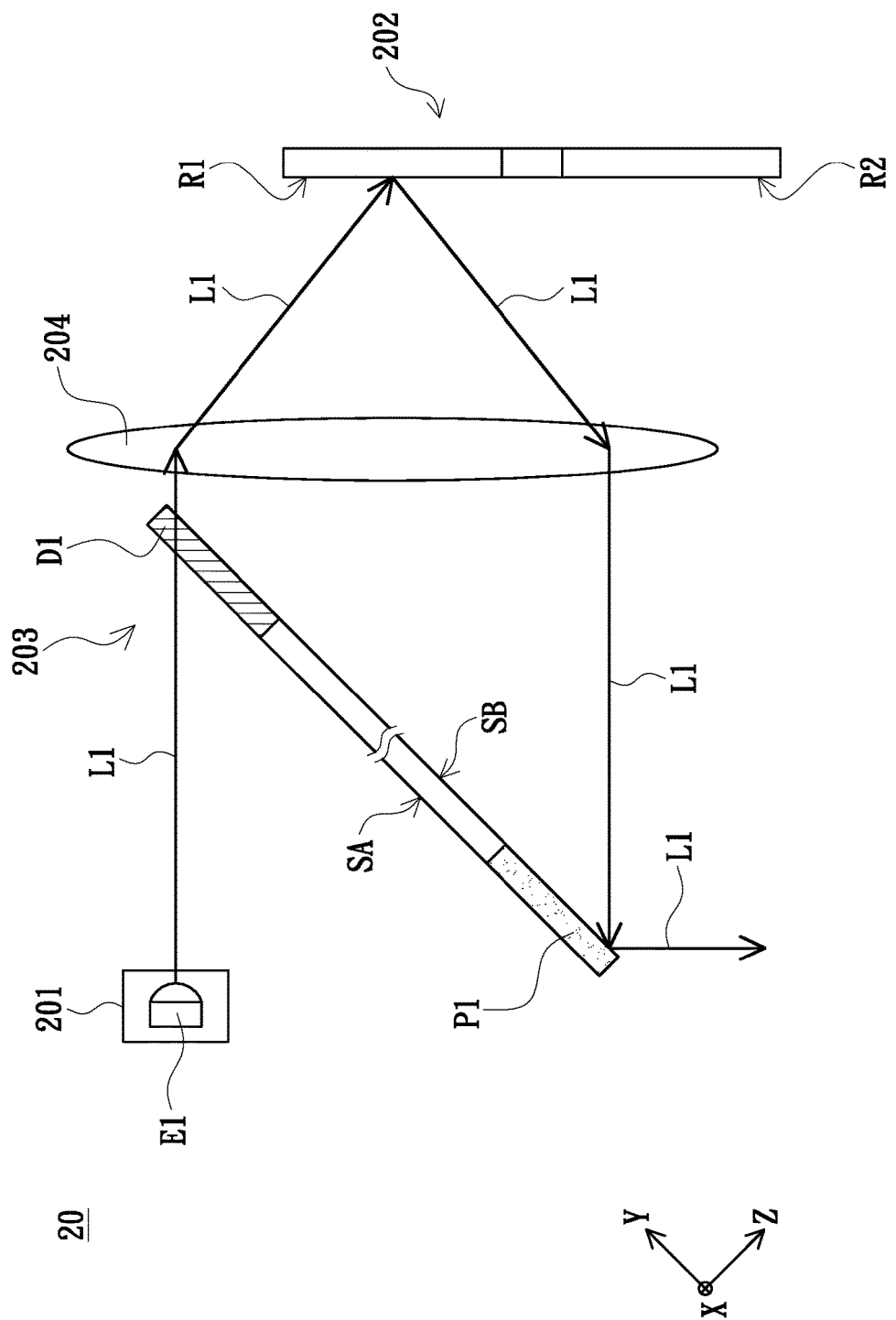
FIG. 2A is a schematic structural view of the illumination system shown in FIG. 1.
Figure 2B:
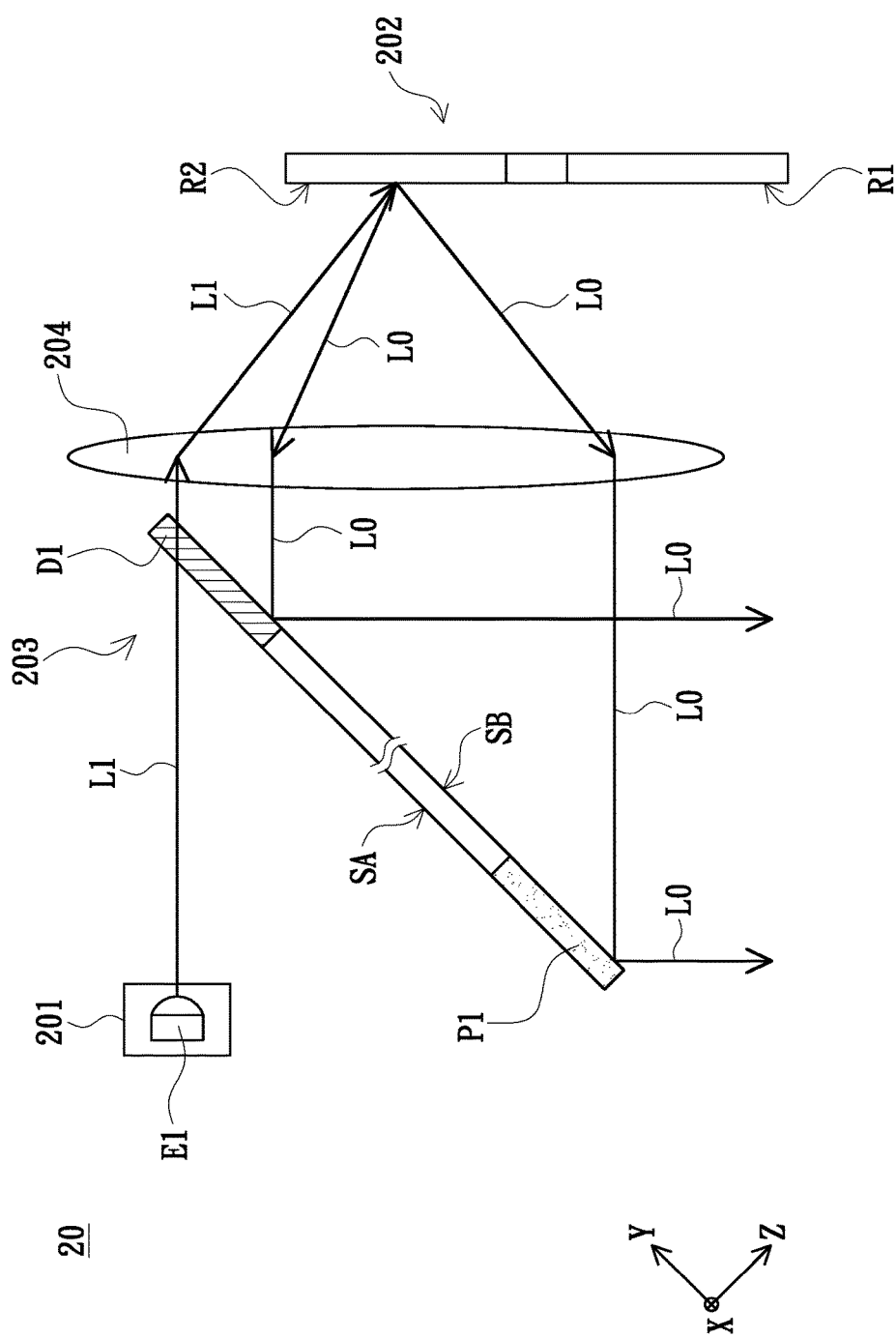
FIG. 2B is a schematic view of the optical path that the first beam is converted into an excited beam in FIG. 2A.
Figure 3:
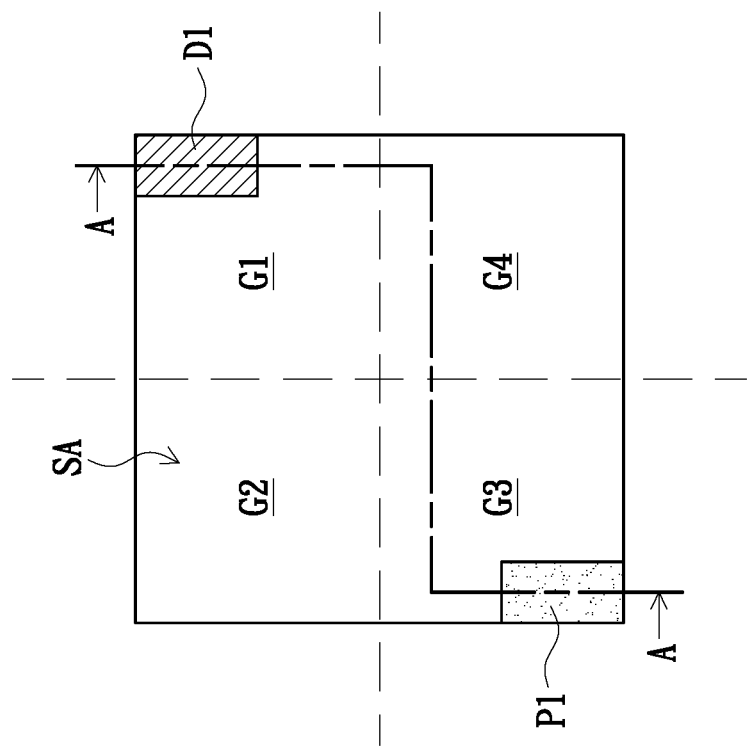
FIG. 3 is a schematic view of the light combining element shown in FIGS. 2A and 2B from another viewing angle.

FIG. 2A is a schematic structural view of the illumination system shown in FIG. 1. FIG. 2B is a schematic view of the optical path that the first beam is converted into an excited beam in FIG. 2A. To simplify the description, the beams in FIGS. 2A and 2B are shown as lines. FIG. 3 is a schematic view of the light combining element shown in FIGS. 2A and 2B from another viewing angle. The light combining element 203 shown in FIGS. 2A and 2B is the cross-sectional structure taken along a line A-A in FIG. 3, and G1, G2, G3, G4 in FIG. 3 represent the first quadrant I, the second quadrant II, the third quadrant IV, the fourth quadrant IV, respectively. As shown in FIGS. 2A, 2B and 3, the illumination system 20 of the embodiment includes an excitation light source group 201, a wavelength conversion element 202 and a light combining element 203. The excitation light source group 201 includes at least one first light emitting element E1 (one is shown as an example). The first light emitting element E1 is configured to provide the first beam L1. The wavelength conversion element 202 has a reflective area R1 and a wavelength conversion area R2. The reflective area R1 and the wavelength conversion area R2 of the wavelength conversion element 202 are configured to cut into the transmission path of the first beam L1 by turns. In the embodiment, the wavelength conversion element 202 is, for example, a phosphor wheel. The reflective area R1 is, for example, a reflective coating film, a mirror or a metal element having a high reflectivity. The surface of the reflective area R1 facing the light combining element 203 may be a smooth surface or non-smooth surface. The wavelength conversion area R2 is, for example, a yellow phosphor coating layer or a green phosphor coating layer, but the invention is not limited thereto. The light combining element 203 is disposed between the excitation light source 201 and the wavelength conversion element 202. The light combining element 203 has at least one first dichroic portion D1, at least one first reflective portion P1, and a first light combining surface SA facing the first light emitting element E1. The first dichroic portion D1 corresponds to the first quadrant G1 of the first light combining surface SA, and the first reflective portion P1 corresponds to the third quadrant G3 of the first combining surface SA. In the embodiment, the first dichroic portion D1 is located in the first quadrant G1 of the first light combining surface SA and the first reflective portion P1 is located in the third quadrant G3 of the first light combining surface SA, as shown in FIG. 3. In addition, in the embodiment, the light combining element 203 is, for example, a glass element, but the invention is not limited thereto. To facilitate a description of the directions of the light combining element 203 shown in FIGS. 2A, 2B and 3, reference may be made to the rectangular coordinate system in FIGS. 2A, 2B and 3, wherein the x-y plane is, for example, parallel to the first light combining surface SA. In the embodiment, the excitation light source group 201 is, for example, a laser light source group or a light emitting diode light source group, but the invention is not limited thereto. In the embodiment, the first dichroic portion D1 of the light combining element 203 is, for example, a dichroic coating film or a dichroic mirror, but the invention is not limited thereto. In the embodiment, the first reflective portion P1 of the light combining element 203 is, for example, a reflective coating film, a mirror or a metal element, but the invention is not limited thereto.

As shown in FIG. 2A, in the embodiment, when the reflective area R1 of the wavelength conversion element 202 is cut into the transmission path of the first beam L1, the first beam L1 penetrates through the first dichroic portion D1 of the light combining element 203 and is transmitted to the reflective area R1 of the wavelength conversion element 202. The reflective area R1 of the wavelength conversion element 202 is configured to reflect the first beam L1 to the first reflective portion P1 of the light combining element 203. The first reflective portion P1 of the light combining element 203 is configured to reflect the first beam L1 from the reflective area R1 of the wavelength conversion element 202. On the other hand, as shown in FIG. 2B, in the embodiment, when the wavelength conversion area R2 of the wavelength conversion element 202 is cut into the transmission path of the first beam L1, the first beam L1 penetrates through the first dichroic portion D1 of the light combining element 203 and is transmitted to the wavelength conversion area R2 of the wavelength conversion element 202. The wavelength conversion area R2 of the wavelength conversion element 202 is configured to convert the first beam L1 into an excited beam L0. The wavelength conversion area R2 is configured to reflect the excited beam L0 to the light combining element 203. The first dichroic portion D1 and the first reflective portion P1 of the light combining element 203 are configured to reflect the excited beam L0. From the above description and FIGS. 2A, 2B, it can be seen that in the embodiment, by configuring the first dichroic portion D1 and the first reflective portion P1 of the light combining element 203 to reflect the excited beam L0 and by configuring the first reflective portion P1 of the light combining element 203 to reflect the first beam L1 from the reflective area R1 of the wavelength conversion element 202, the first beam L1 and the excited beam L0 constitute the illumination beam IL1 as shown in FIG. 1. In the embodiment, the first beam L1 emitted by the first light emitting element E1 is, for example, a blue beam, and the excited beam L0 from the wavelength conversion area R2 is, for example, a yellow beam or a green beam, but the invention is not limited thereto.

As shown in FIGS. 2A and 2B, the illumination system 20 of the embodiment further includes a lens group 204. To simplify the description, the lens group 204 in the embodiment is illustrated as one lens, but the invention is not limited thereto. In the embodiment, the lens group 204 is located between the light combining element 203 and the wavelength conversion element 202, and the lens group 204 is located on the transmission path of the first beam L1 from the light combining element 203. Thus, the lens group 204 can transmit the first beam L1 to the reflective area R1 or the wavelength conversion area R2 of the wavelength conversion element 202. Further, the lens group 204 is also located on the transmission path of the excited beam L0 and on the transmission path of the first beam L1 from the reflective area R1 of the wavelength conversion element 202. Thus, the lens group 204 can transmit the excited beam L0 and the first beam L1 to the first dichroic portion D1 or the first reflective portion P1 of the light combining element 203.

From the above description, it can be seen that in the illumination system 20 of the embodiment, the light combining element 203 is disposed between the excitation light source group 201 and the wavelength conversion element 202, and the at least one first dichroic portion D1 and the at least one first reflective portion P1 of the light combining element 203 are located in (or correspond to) the first quadrant G1 and the third quadrant G3 of the first light combining surface SA, respectively. With this structural design, the effect of simplifying the optical path is effectively achieved and accordingly the number of optical elements of the illumination system 20 can be greatly reduced, thereby reducing the cost, the size, and easily adding an extra supplementary light source. However, the first dichroic portion D1 being locating in (or, corresponding to) the first quadrant G1 of the first light combining surface SA and the first reflective portion P1 being locating in (or, corresponding to) the third quadrant G3 of the first light combining surface SA are a point of view of one embodiment of the invention. From another point of view, in other embodiments, the first dichroic portion D1 may be located in (or correspond to) the second quadrant G2 of the first light combining surface SA and the first reflective portion P1 may be located in (or correspond to) the fourth quadrant G4 of the first light combining surface SA, and so on from the other point of views.

Figure 4:
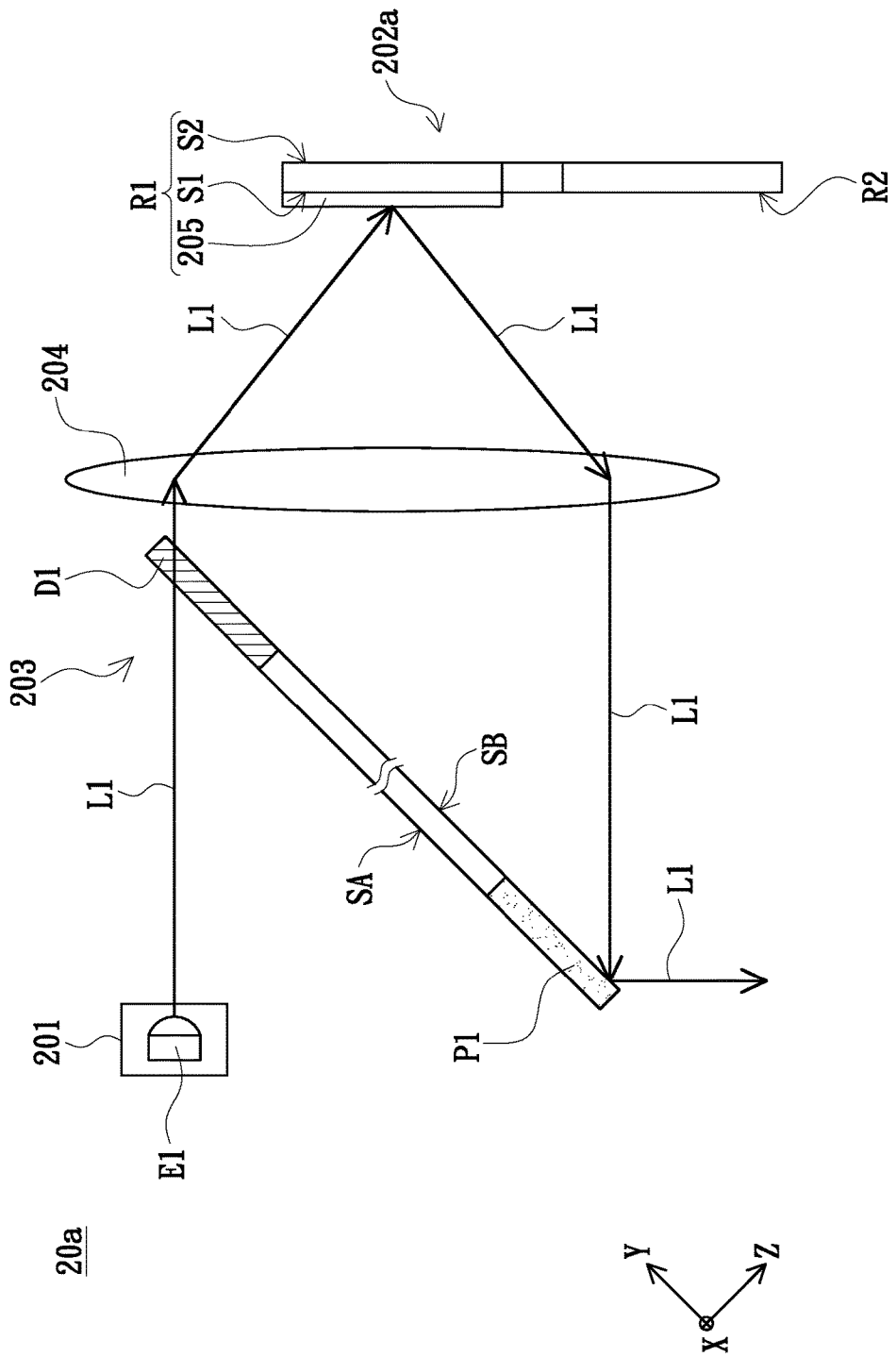
FIG. 4 is a schematic structural view of an illumination system in accordance with another embodiment of the invention.

FIG. 4 is a schematic structural view of an illumination system in accordance with another embodiment of the invention. As shown in FIG. 4, the illumination system 20a of the embodiment is similar to the illumination system 20 shown in FIGS. 2A and 2B, and the difference mainly lies in that the reflective area R1 of the wavelength conversion element 202a of the embodiment includes, for example, a glass element and a reflective film layer 205. The glass element has a first surface S1 and a second surface S2. The first surface S1 of the glass element faces the light combining element 203. The second surface S2 is opposite to the first surface S1. The reflective film layer 205 is disposed on the first surface S1. In the embodiment, the reflective film layer 205 is configured to reflect the first beam L1 from the first dichroic portion D1 of the light combining element 203 so as to reflect the first beam L1 to the first reflective portion P1 of the light combining element 203. In addition, the embodiment does not limit the disposing position of the reflective film layer 205. In addition being disposed on the first surface S1 of the glass element, the, the reflective film layer 205 may be disposed on the second surface S2 of the glass element in other unillustrated embodiments.

Figure 5:
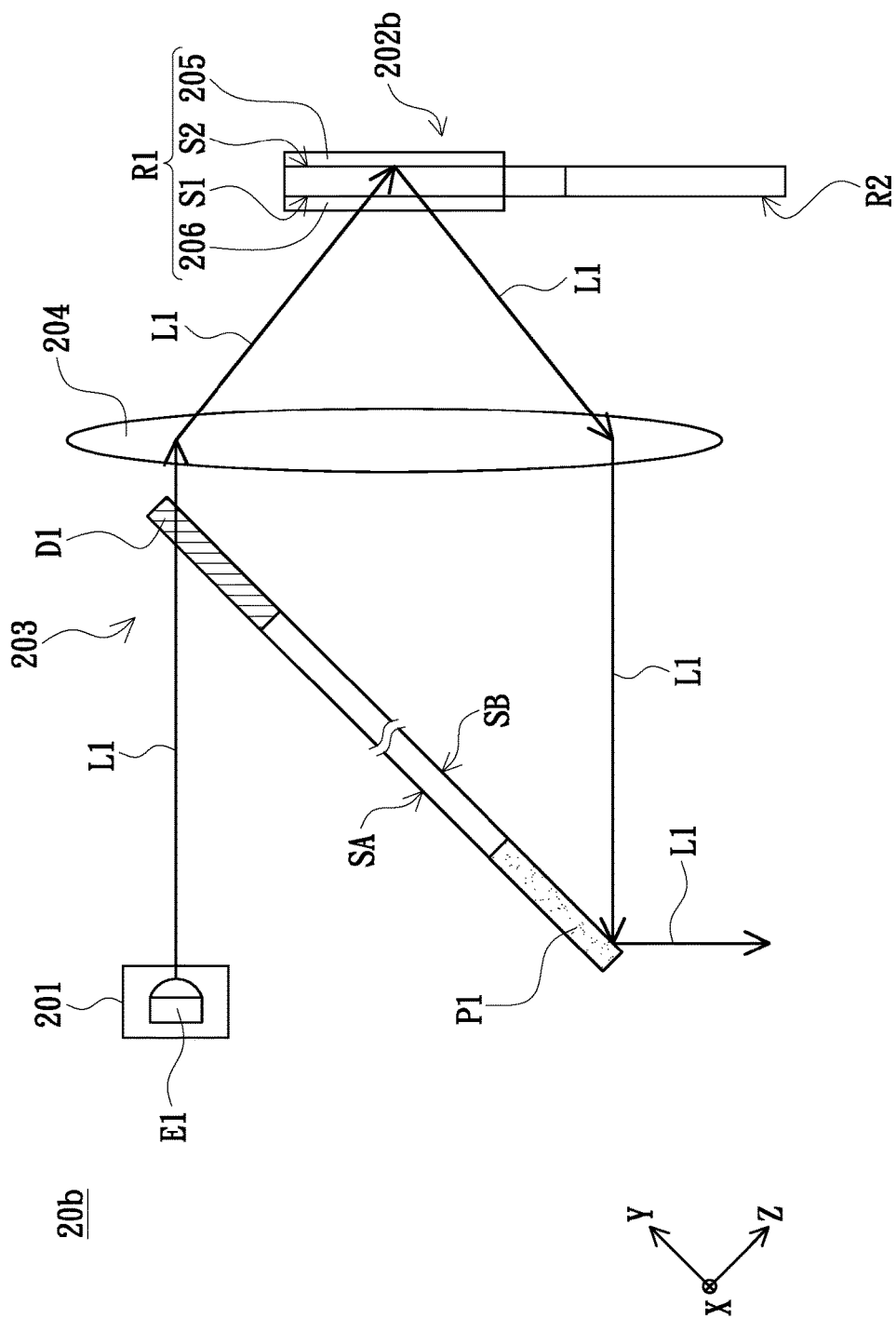
FIG. 5 is a schematic structural view of an illumination system in accordance with another embodiment of the invention.

FIG. 5 is a schematic structural view of an illumination system in accordance with another embodiment of the invention. As shown in FIG. 5, the illumination system 20b of the embodiment is similar to the illumination system 20a shown in FIG. 4, and the difference mainly lies in that the reflective area R1 of the wavelength conversion element 202b of the illumination system 20b of the embodiment further has a diffusion structure 206. The glass element has a first surface S1 facing the light combining element 203 and a second surface S2 opposite to the first surface S1. The diffusion structure 206 is disposed on the first surface S1 and the reflective film layer 205 is disposed on the second surface S2. In the embodiment, the diffusion structure 206 is configured to scatter the first beam L1 from the first dichroic portion D1 of the light combining element 203, and then the first beam L1 is reflected by the reflective film layer 205 to the first reflective portion P1 of the light combining element 203.

Figure 6:
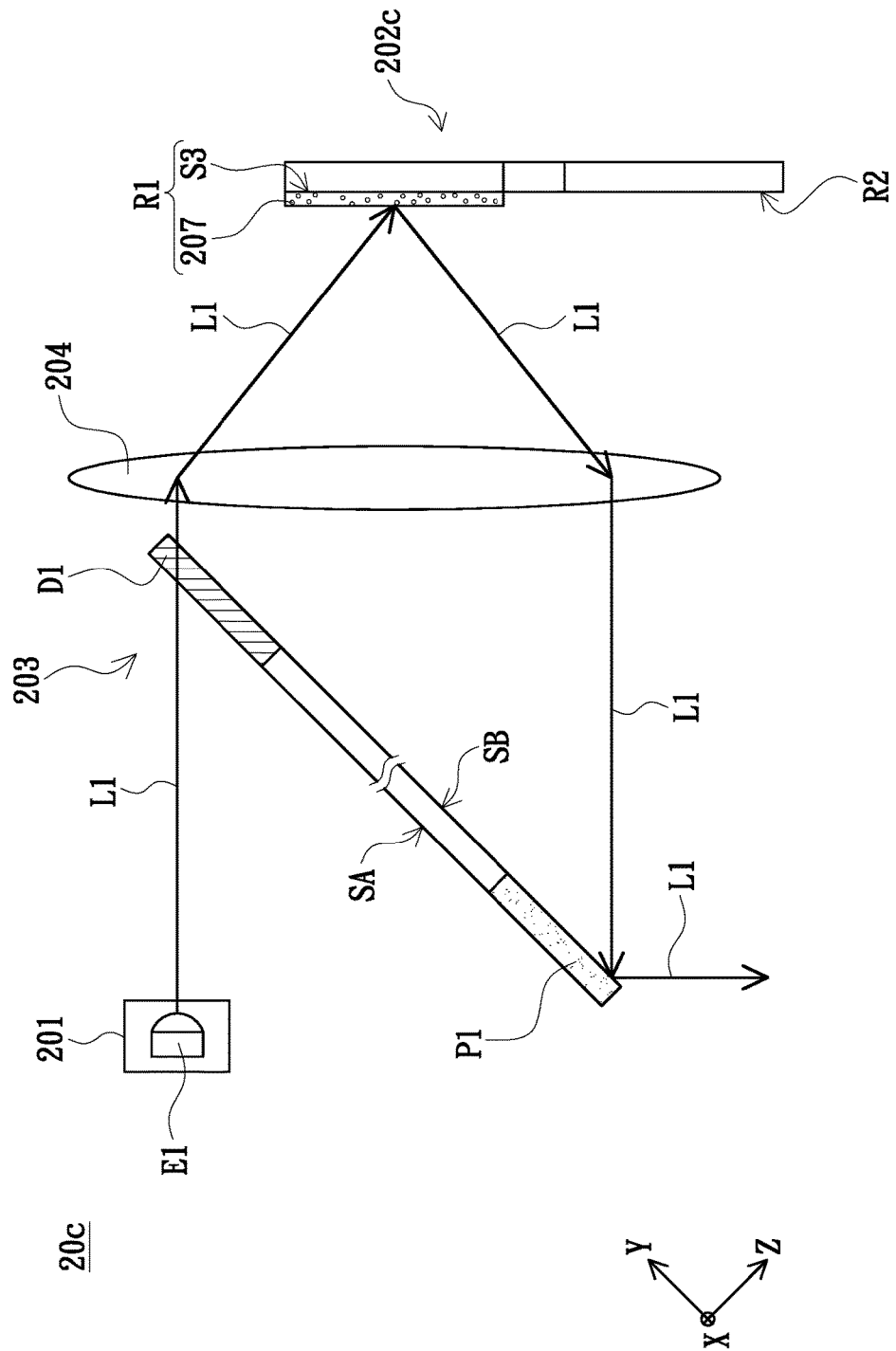
FIG. 6 is a schematic structural view of an illumination system in accordance with another embodiment of the invention.

FIG. 6 is a schematic structural view of an illumination system in accordance with another embodiment of the invention. As shown in FIG. 6, the illumination system 20c of the embodiment is similar to the illumination system 20 shown in FIGS. 2A and 2B, and the difference mainly lies in that the reflective area R1 of the wavelength conversion element 202c of the illumination system 20c of the embodiment has a reflective surface S3 and a plurality of wavelength conversion substances 207. In the embodiment, the wavelength conversion materials 207 are, for example, phosphors, and the phosphors are distributed on the reflective surface S3 to form a phosphor layer on the reflective surface S3. In the embodiment, the effect of the wavelength conversion substances 207 distributed on the reflective surface S3 is to adjust the color effect of the color light of the first beam L1 from the first dichroic portion D1 of the light combining element 203 and to effectively suppress the degree of speckles of the first beam L1, thereby enhancing the image quality of the projector.

Figure 7:
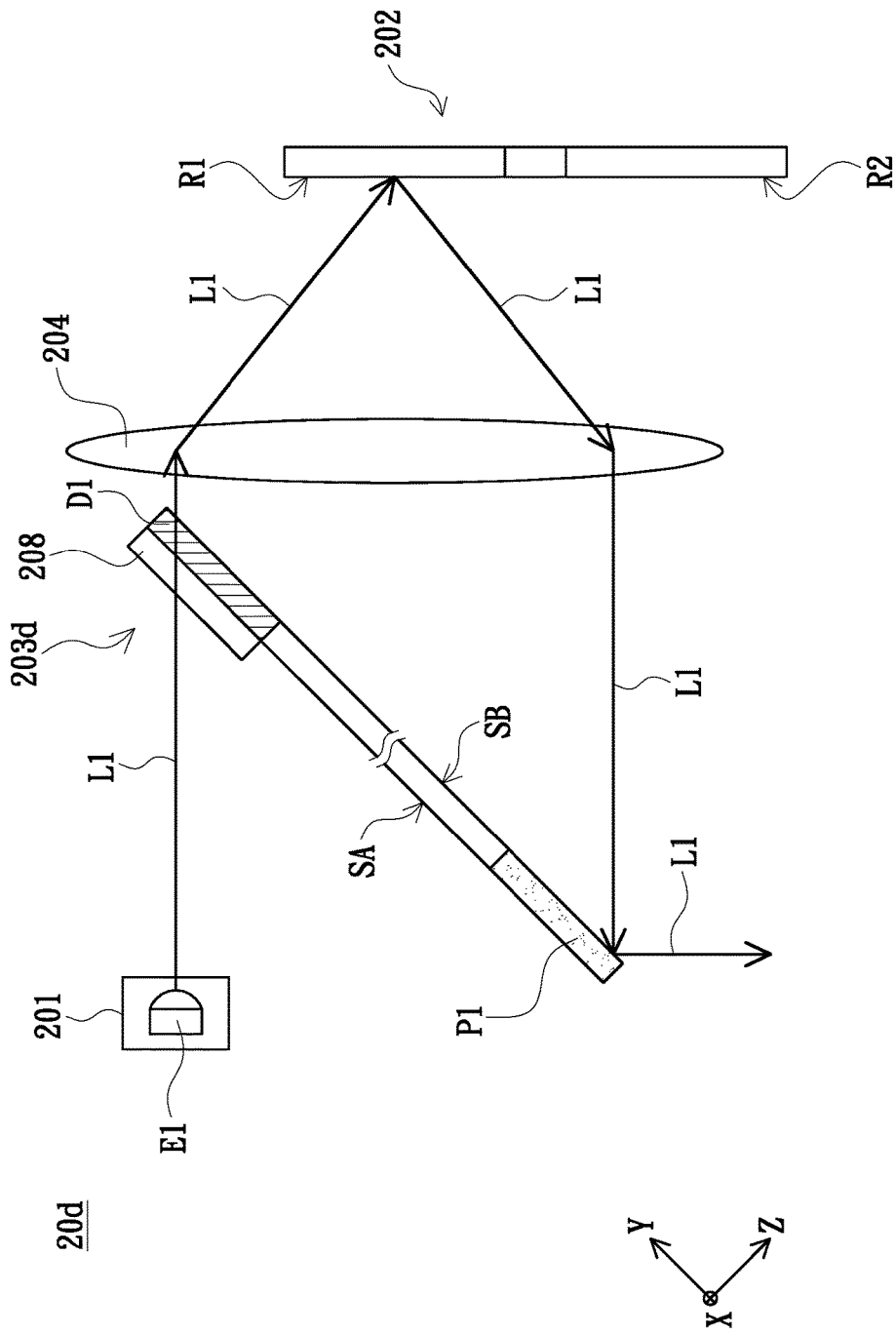
FIG. 7 is a schematic structural view of an illumination system in accordance with another embodiment of the invention.

FIG. 7 is a schematic structural view of an illumination system in accordance with another embodiment of the invention. As shown in FIG. 7, the illumination system 20d of the embodiment is similar to the illumination system 20 shown in FIGS. 2A and 2B, and the difference mainly lies in that the light combining element 203d of the illumination system 20d of the embodiment further includes a diffusion structure 208. In the embodiment, the diffusion structure 208 is disposed on the first dichroic portion D1 and located on the surface of the first dichroic portion D1 adjacent to the excitation light source group 201 (i.e., a portion of the first light combining surface SA). However, the invention does not limit the disposing position of the diffusion structure 208. In an unillustrated embodiment, the diffusion structure 208 is, for example, located on the surface of the first dichroic portion D1 away from the excitation light source group 201 (i.e., the second light combining surface SB opposite to the first light combining surface SA). In still another unillustrated embodiment, the diffusion structure 208 is, for example, disposed on the first reflective portion P1 and located on the surface of the first reflective portion P1 away from the excitation light source group 201 (i.e., a portion of the second light combining surface SB).

Figure 8A:
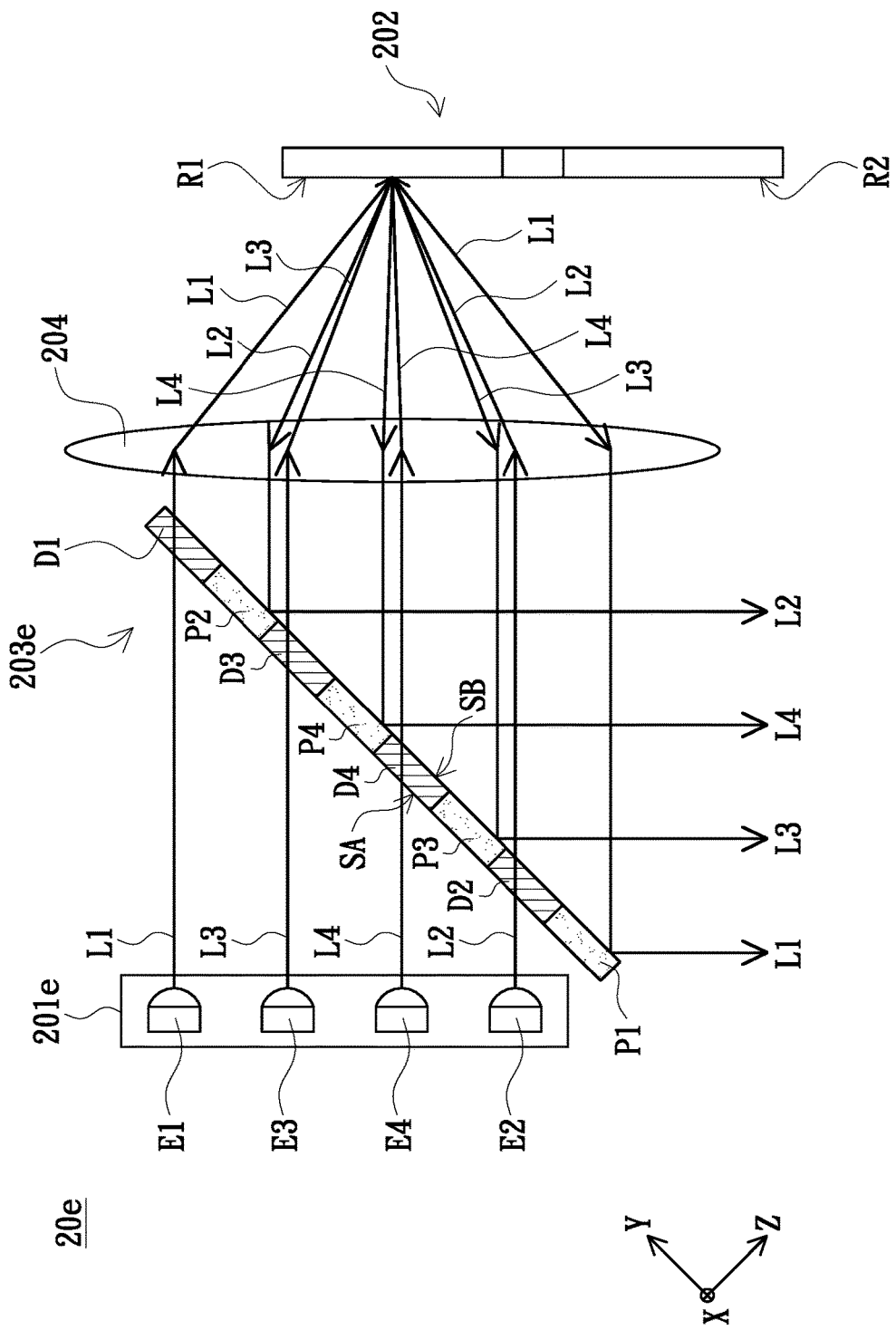
FIG. 8A is a schematic structural view of an illumination system in accordance with another embodiment of the invention.
Figure 8B:
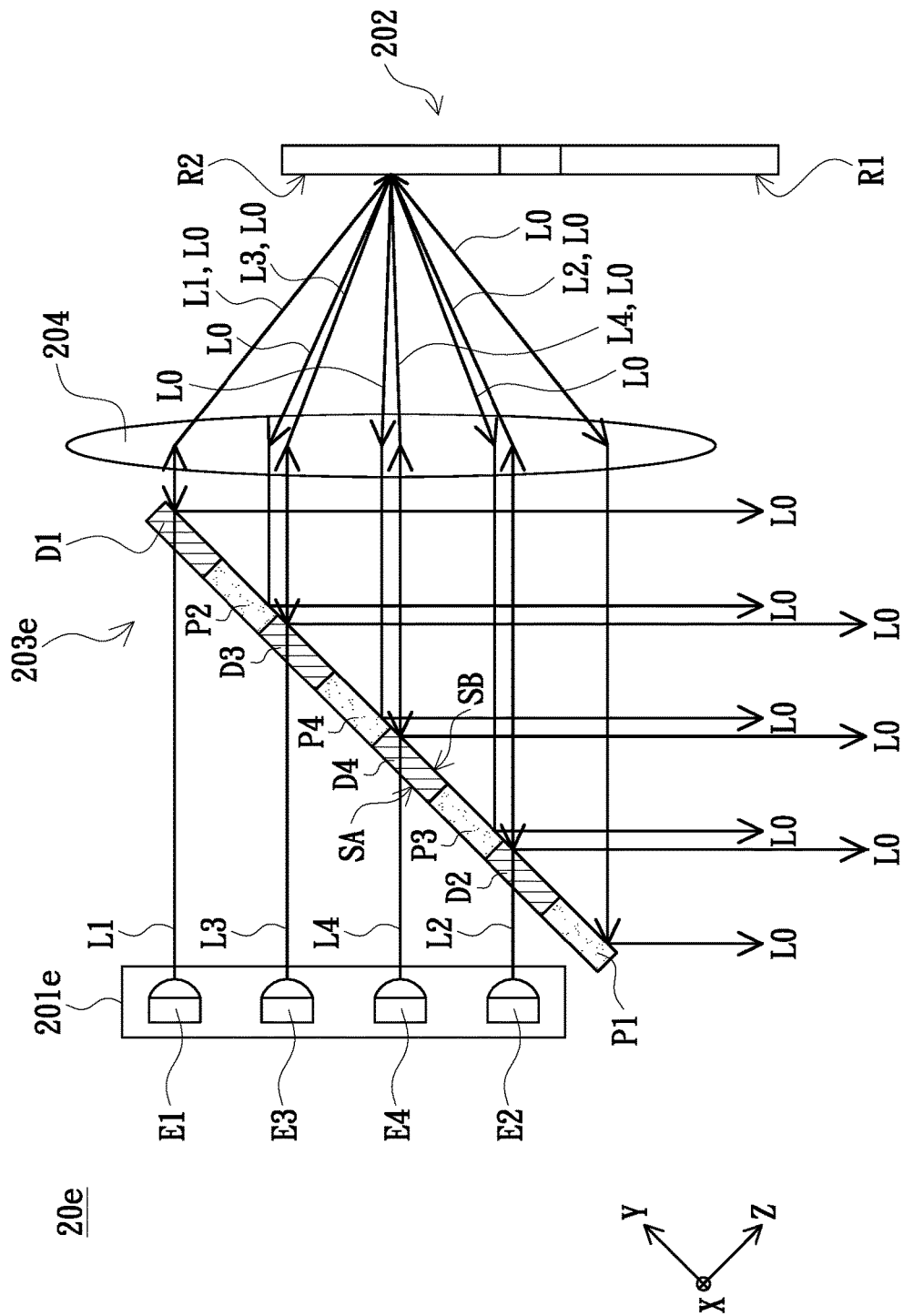
FIG. 8B is a schematic view of the optical paths that the first beam to the fourth beam are converted into the respective excited beams in FIG. 8A.
Figure 8C:
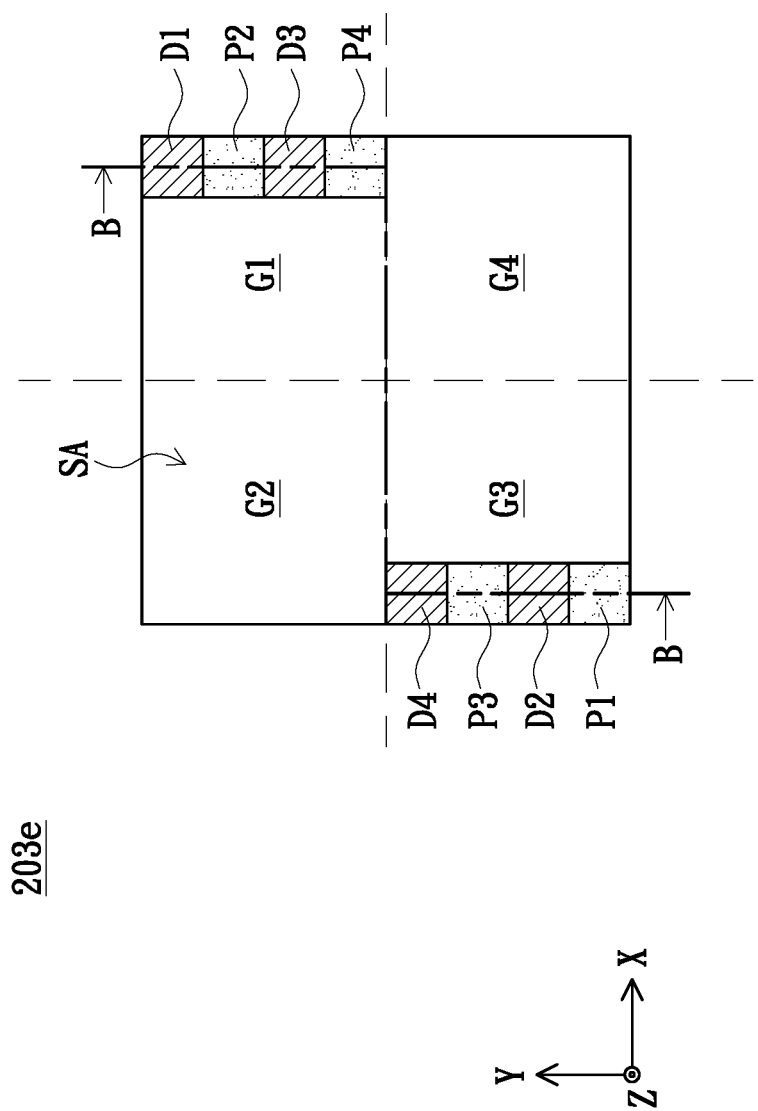
FIG. 8C is a schematic view of the light combining element shown in FIGS. 8A and 8B from another viewing angle.

FIG. 8A is a schematic structural view of an illumination system in accordance with another embodiment of the invention. FIG. 8B is a schematic view of the optical paths that the first beam L1 to the fourth beam L4 are converted into the respective excited beams in FIG. 8A. FIG. 8C is a schematic view of the light combining element shown in FIGS. 8A and 8B from another viewing angle, wherein the light combining element 203e shown in FIGS. 8A and 8B is the cross-sectional structure taken along a line B-B in FIG. 8C. As shown in FIGS. 8A to 8C, the illumination system 20e of the embodiment is similar to the illumination system 20 shown in FIGS. 2A and 2B, and the difference mainly lies in that the excitation light source 201e of the illumination system 20e of the embodiment further includes a second light emitting element E2, a third light emitting element E3 and a fourth light emitting element E4, and the light combining element 203e further includes a second dichroic portion D2, a third dichroic portion D3, a fourth dichroic portion D4, a second reflective portion P2, a third reflective portion P3 and a fourth reflective portion P4. In the embodiment, the second light emitting element E2 is configured to emit a second beam L2, the third light emitting element E3 is configured to emit a third beam L3, the fourth light emitting element E4 is configured to emit a fourth beam L4, the second dichroic portion D2 is located on (or correspond to) the third quadrant G3 of the first light combining surface SA, the third dichroic portion D3 is located in (or correspond to) the first quadrant G1 of the first light combining surface SA, the fourth dichroic portion D4 is located in (or correspond to) the third quadrant G3 of the first light combining surface SA, the second reflective portion P2 is located in (or correspond to) the first quadrant G1 of the first light combining surface SA, the third reflective portion P3 is located in (or correspond to) the third quadrant G3 of the first light combining surface SA, and the fourth reflective portion P4 is located in (or correspond to) the first quadrant G1 of the first light combining surface SA. In the embodiment, the first reflective portion P1, the second dichroic portion D2, the third reflective portion P3 and the fourth dichroic portion D4 are arranged in the third quadrant G3 of the first light combining surface SA, wherein the second dichroic portion D2 and the third reflective portion P3 are located between the first reflective portion P1 and the fourth dichroic portion D4, the second dichroic portion D2 is adjacent between the first reflective portion P1 and the third reflective portion P3, and the third reflective portion P3 is adjacent between the second dichroic portion D2 and the fourth dichroic portion D4. In the embodiment, the first dichroic portion D1, the second reflective portion P2, the third dichroic portion D3 and the fourth reflective portion P4 are arranged in the first quadrant G1 of the first light combining surface SA, wherein the third dichroic portion D3 and the second reflective portion P2 are located between the fourth reflective portion P4 and the first dichroic portion D1, the second reflective portion P2 is adjacent between the first dichroic portion D1 and the third dichroic portion D3, and the third dichroic portion D3 is adjacent between the second reflective portion P2 and the fourth reflective portion P4.

Figure 8D:
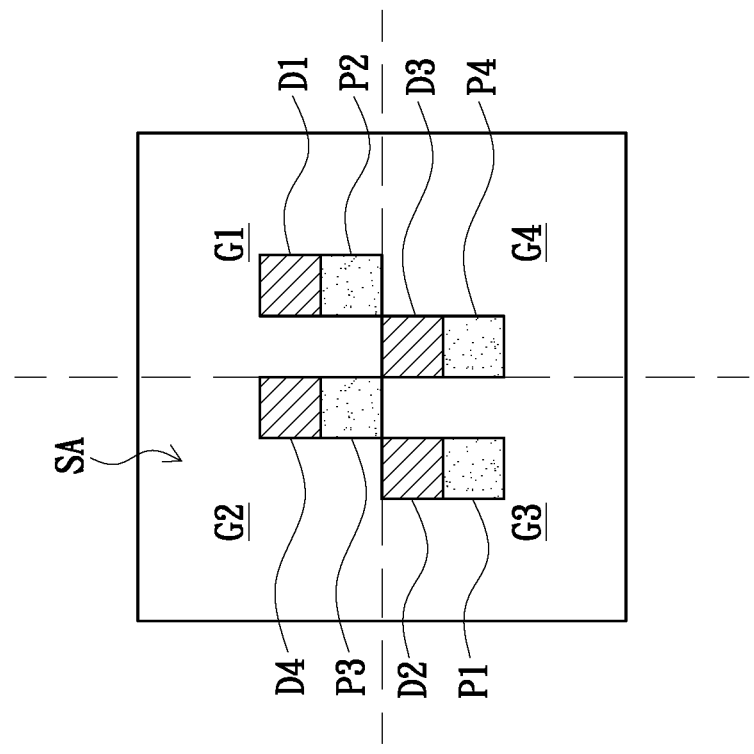
FIGS. 8D to 8G are schematic views of a light combining element in accordance with some embodiments of the invention.
Figure 8E:
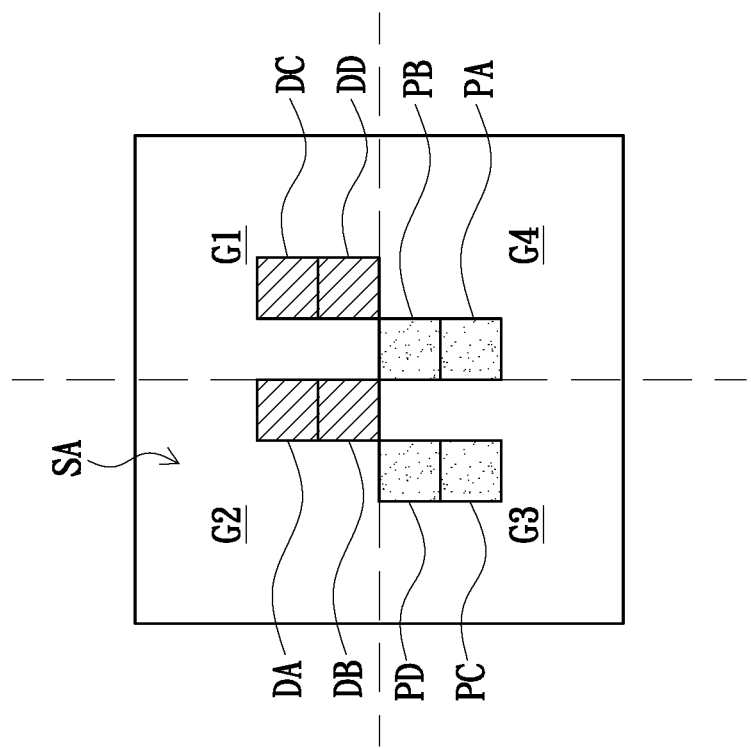
Figure 8F:
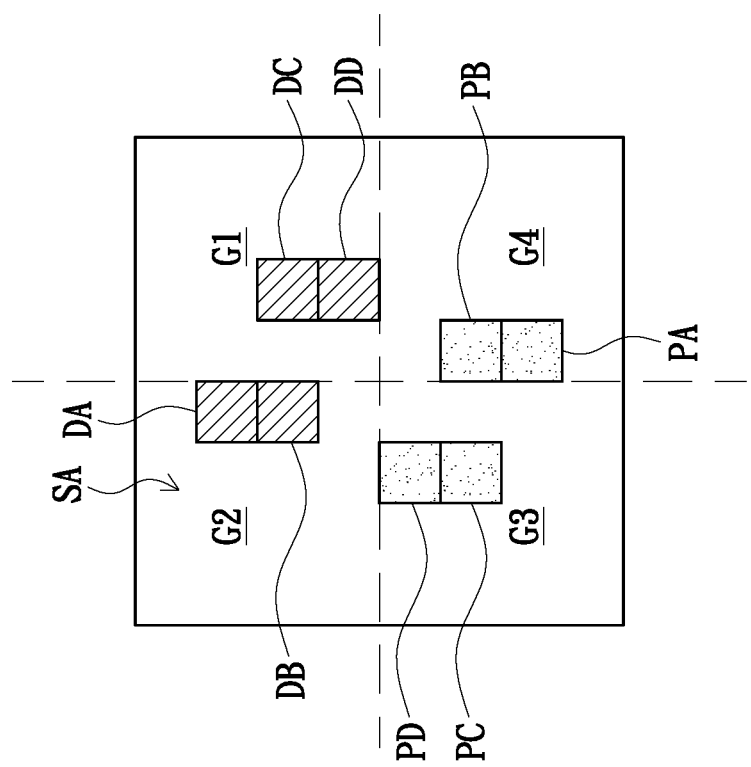
Figure 8G:
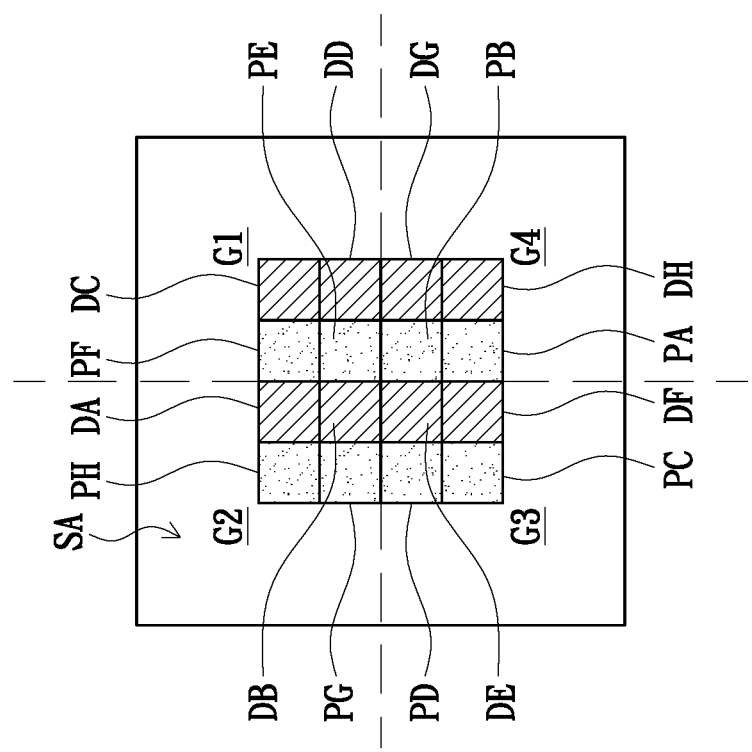

As shown in FIG. 8A, in the embodiment, when the reflective area R1 of the wavelength conversion element 202 is cut into the transmission paths of the second beam L2 and the fourth beam L4, the second beam L2 and the fourth beam L4 respectively penetrate through the second dichroic portion D2 and the fourth dichroic portion D4 of the light combining element 203e and are transmitted to the reflective area R1 of the wavelength conversion element 202. In the embodiment, the reflective area R1 of the wavelength conversion element 202 is configured to reflect the second beam L2 and the fourth beam L4 to the second reflective portion P2 and the fourth reflective portion P4 of the light combining element 203e respectively, the second reflective portion P2 of the light combining element 203e is configured to reflect the second beam L2 from the reflective area R1 of the wavelength conversion element 202, and the fourth reflective portion P4 of the light combining element 203e is configured to reflect the fourth beam L4 from the reflective area R1 of the wavelength conversion element 202. As shown in FIG. 8B, in the embodiment, when the wavelength conversion area R2 of the wavelength conversion element 202 is cut into the transmission paths of the second beam L2 and the fourth beam L4, the second beam L2 and the fourth beam L4 respectively penetrates through the second dichroic portion D2 and the fourth dichroic portion D4 of the light combining element 203e and are transmitted to the wavelength conversion area R2 of the wavelength conversion element 202. In the embodiment, the wavelength conversion area R2 of the wavelength conversion element 202 is configured to convert the second beam L2 and the fourth beam L4 into the excited beam L0, and the wavelength conversion area R2 is configured to reflect the excited beam L0 to the light combining element 203e. In the embodiment, the second dichroic portion D2, the second reflective portion P2, the fourth dichroic portion D4 and the fourth reflective portion P4 of the light combining element 203e are configured to reflect the excited beam L0. In addition, in the embodiment, the transmission path of the first beam L1 is the same as that of the first beam L1 disclosed in FIGS. 2A to 2B, and the transmission path of the third beam L3 is similar to that of the first beam L1, and no redundant detail is to be given herein. From above description, it can be seen that the light combining element 203e of the embodiment can cause the first beam L1, the second beam L2, the third beam L3, the fourth beam L4 and the excited beam L0 to constitute the illumination beam IL1 as shown in FIG. 1. In the embodiment, the first beam L1, the second beam L2, the third beam L3 and the fourth beam L4 respectively emitted by the first light emitting element E1, the second light emitting element E2, the third light emitting element E3 and the fourth light emitting element E4, L4 are, for example, blue beams, and the excited beam L0 from the wavelength conversion area R2 is, for example, a yellow beam or a green beam, but the invention is not limited thereto. In addition, in the embodiment, the transmission path of the first beam L1 is the same as that of the first beam L1 disclosed in FIGS. 2A and 2B, and the transmission path of the third beam L3 is similar to that of the first beam L1, and no redundant detail is to be given herein. In addition, the invention does not limit the number of the light emitting elements. In addition to the one light emitting element shown in FIGS. 2A, 2B and the four light emitting elements shown in FIGS. 8A, 8B, the number of the light emitting elements may be three or more than four, and the numbers of the dichroic portions and the reflective portions of the light combining element are increased or decreased corresponding to the number of the light emitting elements. The invention does not limit the arrangements of the first reflective portion, the second reflective portion, the third reflective portion, the fourth reflective portion, the first dichroic portion, the second dichroic portion, the third dichroic dichroic portion and the fourth dichroic portion. For example, the arrangements of the first reflective portion P1, the second reflective portion P2, the third reflective portion P3, the fourth reflective portion P4, the first dichroic portion D1, the second dichroic portion D2, the third dichroic portion D3 and the fourth dichroic portion D4 disposed on the first light combining surface SA may be the same as those in the light combining elements 203e and 203f shown in FIGS. 8C and 8D, but the invention is not limited thereto. In other embodiments, the arrangements of the first reflective portion PA, the second reflective portion PB, the third reflective portion PC, the fourth reflective portion PD, the first dichroic portion DA, the second dichroic portion DB, the third dichroic portion DC and the fourth dichroic portion DD disposed on the first light combining surface SA may be the same as those in the light combining elements 203g and 203h shown in FIGS. 8E and 8F, but the invention is not limited thereto. In other embodiments, the arrangements of the plurality of reflective portions PA, PB, PC, PD, PE, PF, PG, PH and the plurality of dichroic portions DA, DB, DC, DD, DE, EF, DG disposed on the first light combining surface SA may be the same as those in the light combining element 203i shown in FIG. 8G, but the invention is not limited thereto.

Figure 9A:
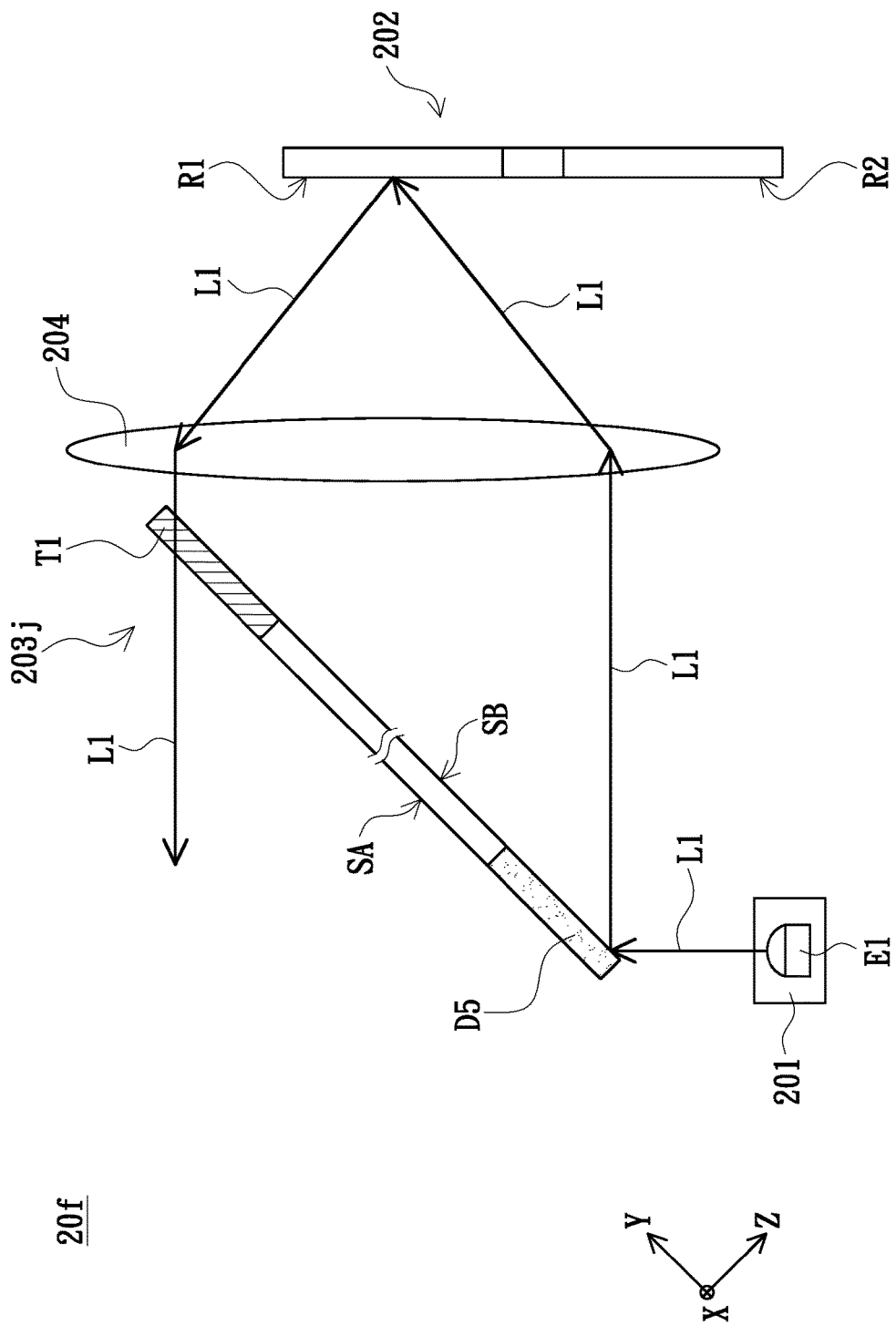
FIG. 9A is a schematic structural view of an illumination system in accordance with another embodiment of the invention.
Figure 9B:
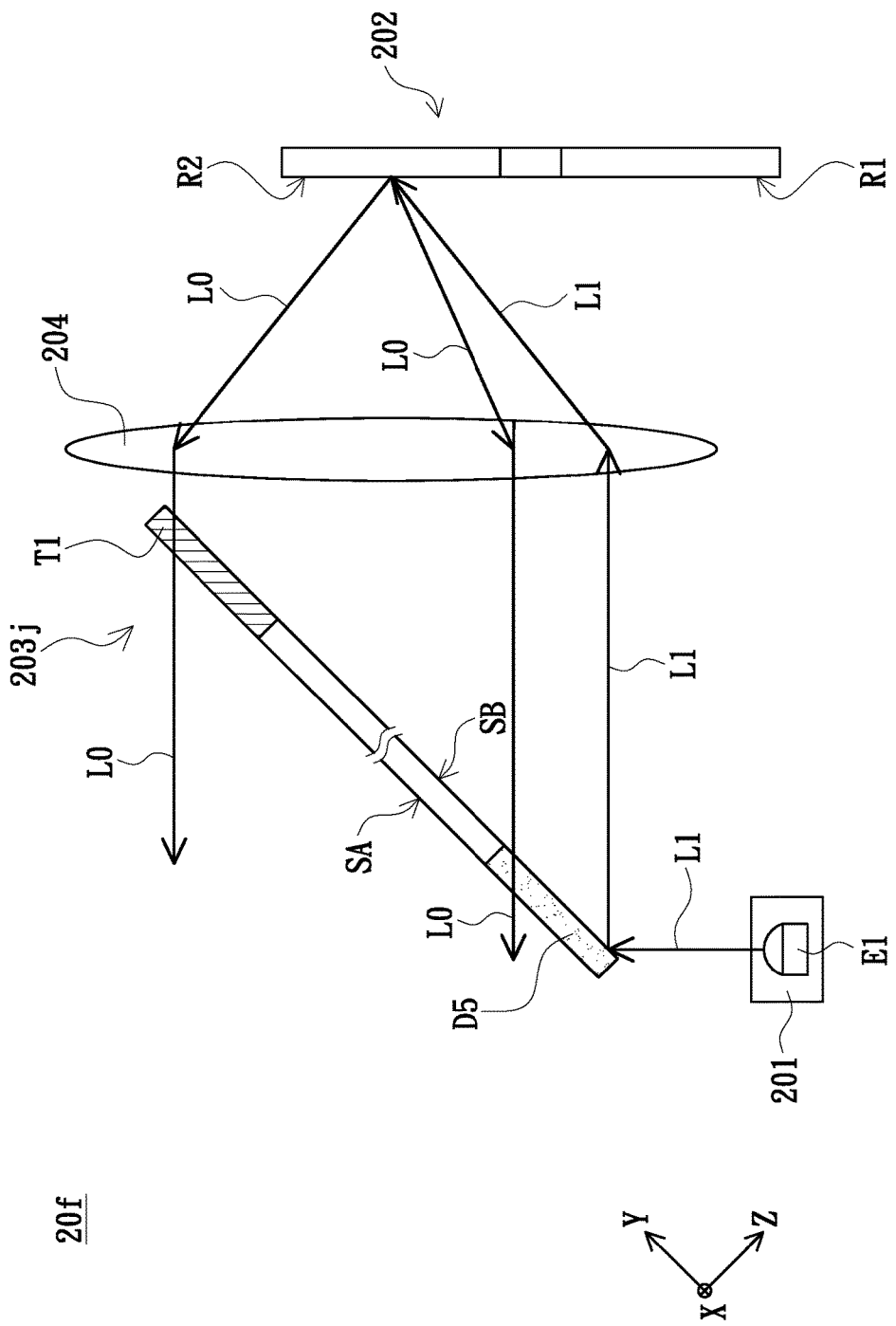
FIG. 9B is a schematic view of the optical path that the first beam are converted into the excited beam shown in FIG. 9A.

FIG. 9A is a schematic structural view of an illumination system in accordance with another embodiment of the invention. FIG. 9B is a schematic view of the optical path that the first beam are converted into the excited beam shown in FIG. 9A. As shown in FIGS. 9A and 9B, the illumination system 20f of the embodiment is similar to the illumination system 20 shown in FIGS. 2A and 2B, and the difference mainly lies in that the excitation light source group 201 of the illumination system 20f of the embodiment is located between the wavelength conversion element 202 and the light combining element 203j. As shown in FIG. 9A, in the embodiment, when the reflective area R1 of the wavelength conversion element 202 is cut into the transmission path of the first beam L1, the first dichroic portion D5 of the light combining element 203j is configured to reflect the first beam L1 to the reflective area R1 of the wavelength conversion element 202, the reflective area R1 of the wavelength conversion element 202 is configured to reflect the first beam L1 to the first penetrating portion T1 of the light combining element 203j, and the first penetrating portion T1 of the light combining element 203j is configured to allow the first beam L1 from the reflective area R1 of the wavelength conversion element 202 to penetrate therethrough. As shown in FIG. 9B, in the embodiment, when the wavelength conversion area R2 of the wavelength conversion element 202 is cut into the transmission path of the first beam L1, the first dichroic portion D5 of the light combining element 203j is configured to reflect the first beam L1 to the wavelength conversion area R2 of the wavelength conversion element 202, the wavelength conversion area R2 of the wavelength conversion element 202 is configured to convert the first beam L1 into the excited beam L0, the wavelength conversion area R2 is configured to reflect the excited beam L0 to the first dichroic portion D5 and the first penetrating portion T1 of the light combining element 203j, and the first dichroic portion D5 and the first penetrating portion T1 are configured to allow the excited beam L0 to penetrate therethrough.

Figure 10:
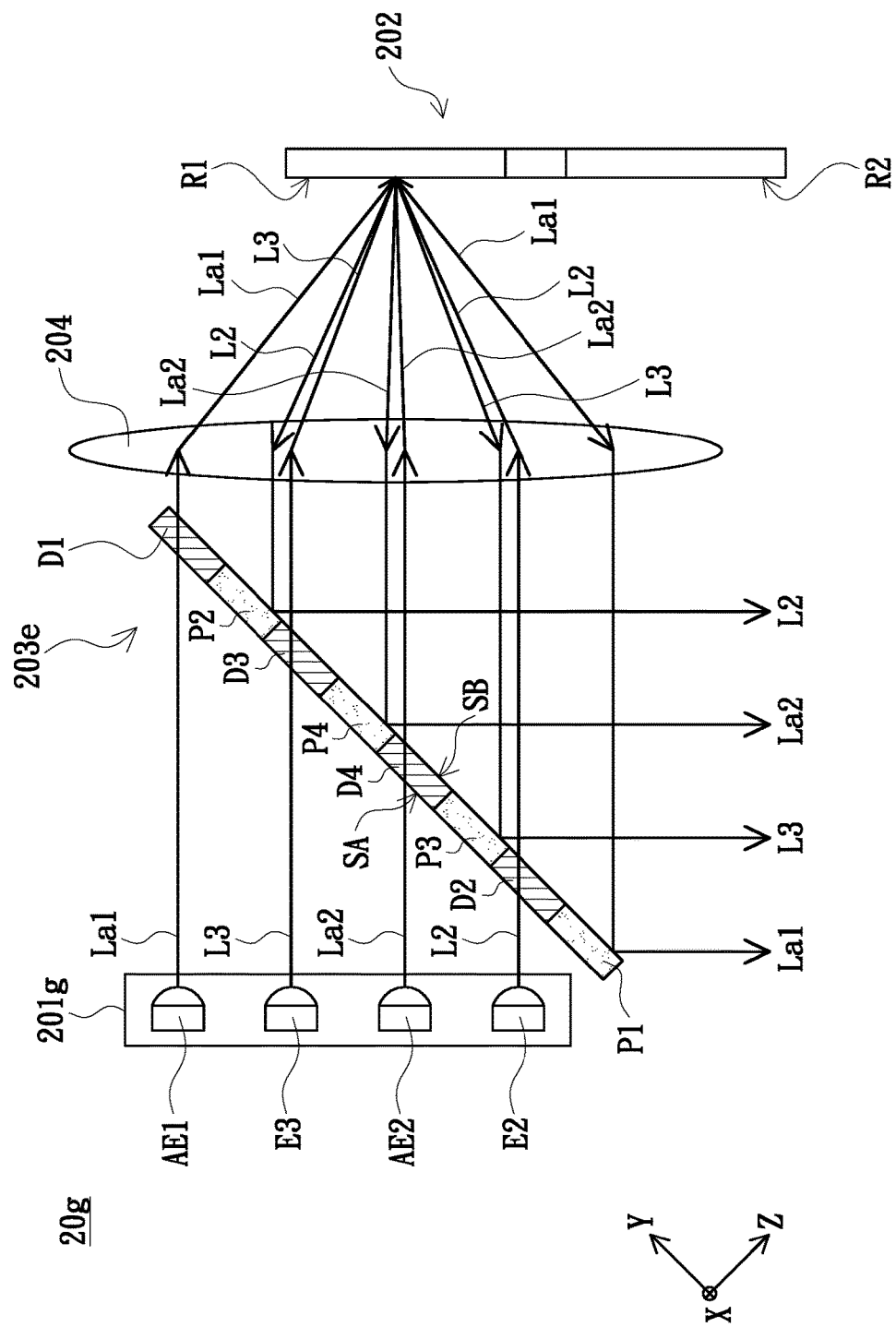
FIG. 10 is a schematic structural view of an illumination system in accordance with another embodiment of the invention.

However, in other embodiments, at least one auxiliary light emitting element may be disposed between two light emitting elements (e.g., the first light emitting element and the second light emitting element) to provide an auxiliary beam for achieving the effect of adjusting the color light of the beam. In addition, the light combining element has at least one third dichroic portion and at least one third reflective portion, and the at least one third dichroic portion and the at least one third reflective portion are correspondingly located on the transmission path of the auxiliary beam (e.g., the auxiliary beam penetrates through the third dichroic portion or the third reflective portion reflects the auxiliary beam). Examples are described as follows. FIG. 10 is a schematic structural view of an illumination system in accordance with another embodiment of the invention. As shown in FIG. 10, the illumination system 20g of the embodiment is similar to the illumination system 20e shown in FIGS. 8A and 8B, and the difference mainly lies in that the first light emitting element E1 and the fourth light emitting element E4 in the illumination system 20e shown in FIGS. 8A, 8B are respectively replaced by the first auxiliary light emitting element AE1 and the second auxiliary light emitting element AE2. That is, the excitation light source group 201g of the illumination system 20g of the embodiment includes the first auxiliary light emitting element AE1, the second auxiliary light emitting element AE2, the second light emitting element E2 and the third light emitting element E3. In the embodiment, the third light emitting element E3 is disposed between the first auxiliary light emitting element AE1 and the second auxiliary light emitting element AE2, and the second auxiliary light emitting element AE2 is disposed between the second light emitting element E2 and the third light emitting element E3. The first auxiliary light emitting element AE1 is configured to emit the first auxiliary beam La1 and the second auxiliary light emitting element AE2 is configured to emit the second auxiliary beam La2. In the embodiment, the first auxiliary beam La1 penetrates through the first dichroic portion D1 of the light combining element 203e and is transmitted to the reflective area R1 of the wavelength conversion element 202. In the embodiment, the reflective area R1 of the wavelength conversion element 202 is configured to reflect the first auxiliary beam La1 to the first reflective portion P1 of the light combining element 203e. The first reflective portion P1 of the light combining element 203e is configured to reflect the first auxiliary beam La1 from the reflective area R1 of the wavelength conversion element 202. In the embodiment, the second auxiliary beam La2 penetrates through the fourth dichroic portion D4 of the light combining element 203 and is transmitted to the reflective area R1 of the wavelength conversion element 202, the reflective area R1 of the wavelength conversion element 202 is configured to reflect the second auxiliary beams La2 to the fourth reflective portion P4 of the light combining element 203e, and the fourth reflective portion P4 of the light combining element 203e is configured to reflect the second auxiliary beam La2 from the reflective area R1 of the wavelength conversion element 202. Thus, the light combining element 203e of the embodiment can cause the first auxiliary beam La1, the second auxiliary beam La2, the second beam L2, the third beam L3 and the excited beam L0 to constitute the illumination beam IL1 as shown in FIG. 1. In the embodiment, by the disposition of the first auxiliary light emitting element AE1 and the second auxiliary light emitting element AE2, the color effect of the beams provided by the light combining element 203e (the second beam L2, the third beam L3, the first auxiliary beam La1 and the second auxiliary beam La2, or the excited beam L0, the first auxiliary beam La1 and the second auxiliary beam La2) can be adjusted/improved, so as to improve the image quality of the projector. In the embodiment, the first auxiliary beam La1 and the second auxiliary beam La2 provided by the first auxiliary light emitting element AE1 and the second auxiliary light emitting element AE2 are, for example, a red beam or a blue beam, but the invention is not limited thereto. The arrangement of the first auxiliary light emitting element AE1, the second auxiliary light emitting element AE2, the second light emitting element E2 and the third light emitting element E3 in the embodiment can also be applied to the architecture of the illumination system 20f as shown in FIGS. 9A and 9B.

Figure 11:
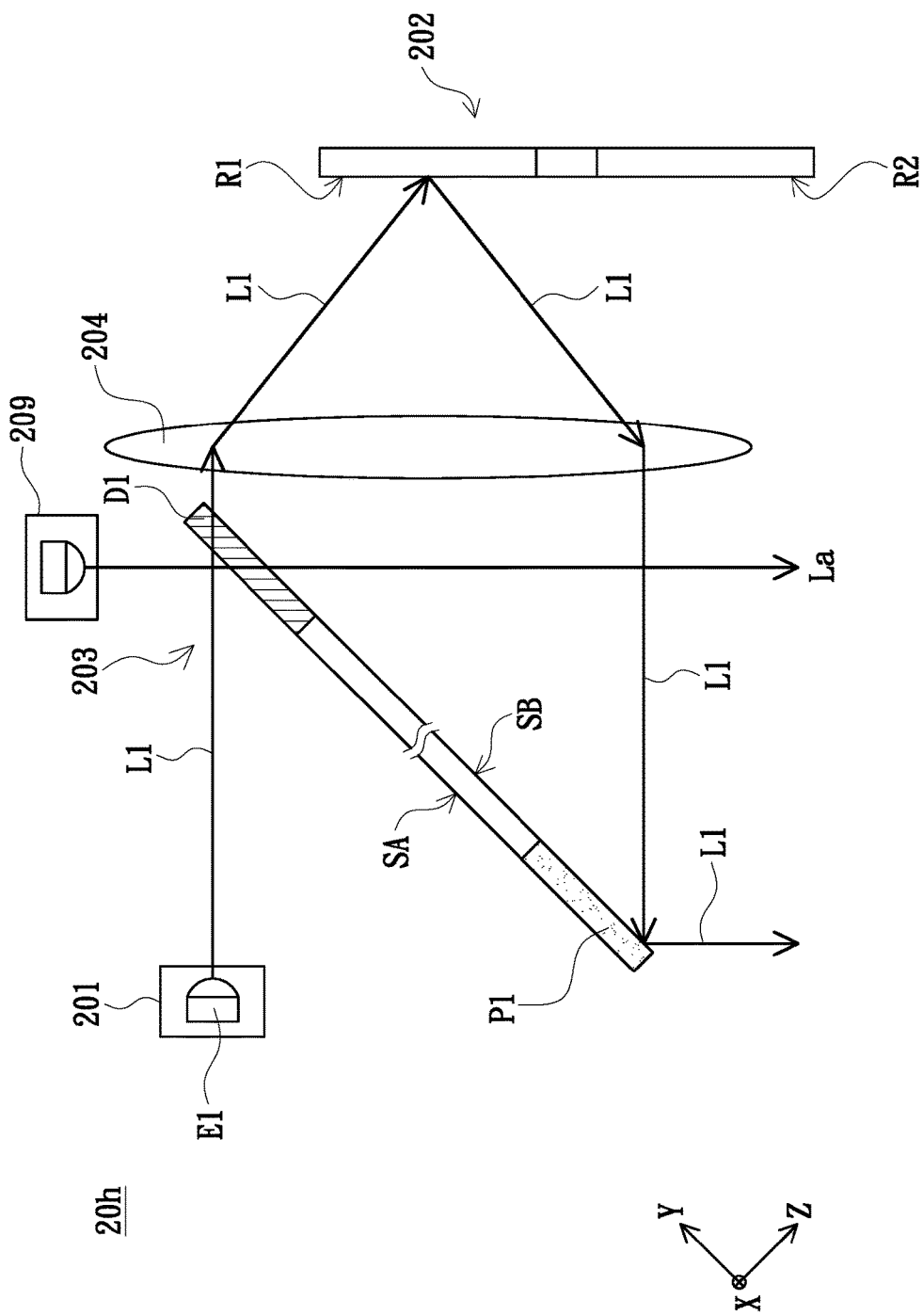
FIG. 11 is a schematic structural view of an illumination system in accordance with another embodiment of the invention.

FIG. 11 is a schematic structural view of an illumination system in accordance with another embodiment of the invention. As shown in FIG. 11, the illumination system 20h of the embodiment is similar to the illumination system 20 shown in FIGS. 2A and 2B, and the difference mainly lies in that the illumination system 20h of the embodiment further includes an auxiliary light source group 209. In the embodiment, the auxiliary light source group 209 is disposed on one side of the excitation light source group 201, and the auxiliary light source group 209 is configured to provide an auxiliary beam La. The auxiliary beam La provided by the auxiliary light source group 209 penetrates through the first dichroic portion D1 of the light combining element 203. In the embodiment, by the disposition of the auxiliary light source group 209, the color effect of the beams provided by the light combining element 203 (the first beam L1 and the auxiliary beam La, or the excited beam L0 and the auxiliary beam La) can be adjusted/improved, so as to improve the image quality of the projector. In the embodiment, the auxiliary beam La provided by the auxiliary light source group 209 is, for example, a red beam or a blue beam, but the invention is not limited thereto.

In summary, in the illumination system according to the embodiment of the invention, the light combining element is disposed between the excitation light source group and the wavelength conversion element, and at least one first dichroic portion and at least one first reflective portion of the light combining element respectively correspond to the first quadrant and the third quadrant of the first light combining surface. With this structural design, the effect of simplifying the optical path is effectively achieved and accordingly the number of optical elements of the illumination system can be greatly reduced, thereby reducing the cost, the size, and easily adding an extra supplementary light source. In addition, the projector according to the embodiment of the invention has the advantages of lower cost and smaller size due to the use of the illumination system.

Figure 12:
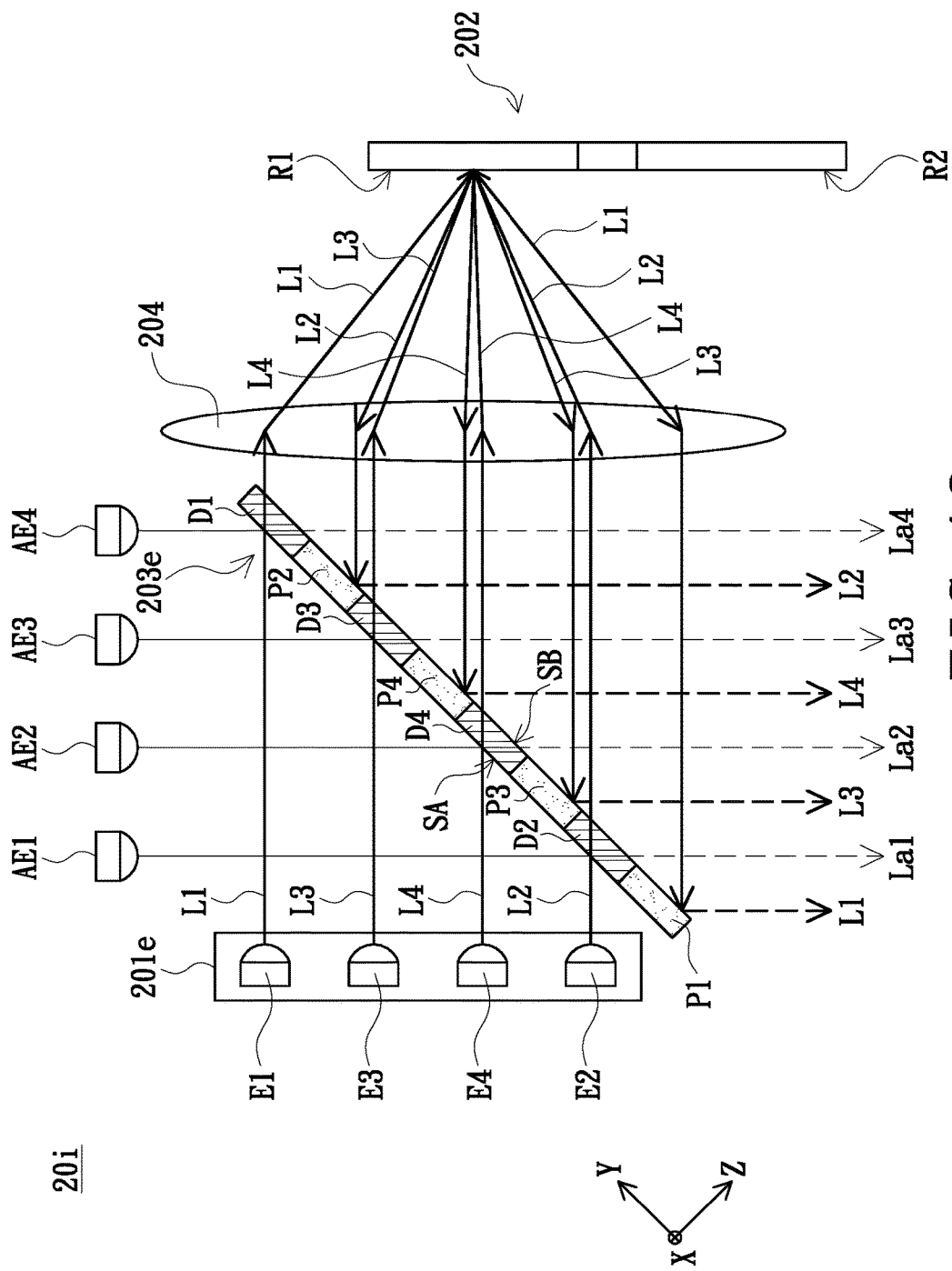
FIG. 12 is a schematic structural view of an illumination system in accordance with another embodiment of the invention.

FIG. 12 is a schematic structural view of an illumination system in accordance with another embodiment of the invention. As shown in FIG. 12, the illumination system 20i of the embodiment is part similar to the illumination system 20e shown in FIGS. 8A and 8B. The illumination system 20i of the embodiment includes a first light emitting element E1, a second light emitting element E2, a third light emitting element E3 and a fourth light emitting element E4, and the light combining element 203e further includes a first dichroic portion D1, a second dichroic portion D2, a third dichroic portion D3, a fourth dichroic portion D4, a first reflective portion P1, a second reflective portion P2, a third reflective portion P3 and a fourth reflective portion P4. In the embodiment, the first light emitting element E1 is configured to emit a first beam L1, the second light emitting element E2 is configured to emit a second beam L2, the third light emitting element E3 is configured to emit a third beam L3, the fourth light emitting element E4 is configured to emit a fourth beam L4.

Additionally, the illumination system 20i further comprises the first auxiliary light emitting element AE1, the second auxiliary light emitting element AE2, the third auxiliary light emitting element AE3 and the fourth auxiliary light emitting element AE4. In the embodiment, the first auxiliary light emitting element AE1 is configured to emit the first auxiliary beam La1. The second auxiliary light emitting element AE2 is configured to emit the second auxiliary beam La2. The third auxiliary light emitting element AE3 is configured to emit the third auxiliary beam La3. The fourth auxiliary light emitting element AE4 is configured to emit the fourth auxiliary beam La4. In the embodiment, the first auxiliary beam La1 penetrates through the second dichroic portion D2 of the light combining element 203e. The second auxiliary beam La2 penetrates through the fourth dichroic portion D4 of the light combining element 203e. The third auxiliary beam La3 penetrates through the third dichroic portion D3 of the light combining element 203e. The fourth auxiliary beam La4 penetrates through the first dichroic portion D1 of the light combining element 203e.

In the embodiment, when the reflective area R1 of the wavelength conversion element 202 is cut into the transmission paths of the first beam L1, the second beam L2, the third beam L3 and the fourth beam L4, the first beam L1, the second beam L2, the third beam L3 and the fourth beam L4 respectively penetrate through the first dichroic portion D1, the second dichroic portion D2, the third dichroic portion D3 and the fourth dichroic portion D4 of the light combining element 203e and are transmitted to the reflective area R1 of the wavelength conversion element 202. In the embodiment, the reflective area R1 of the wavelength conversion element 202 is configured to reflect the first beam L1, the second beam L2, the third beam L3 and the fourth beam L4 to the first reflective portion P1, the second reflective portion P2, the third reflective portion P3 and the fourth reflective portion P4 of the light combining element 203e respectively, the first reflective portion P1 of the light combining element 203e is configured to reflect the first beam L1 from the reflective area R1 of the wavelength conversion element 202, the second reflective portion P2 of the light combining element 203e is configured to reflect the second beam L2 from the reflective area R1 of the wavelength conversion element 202, the third reflective portion P3 of the light combining element 203e is configured to reflect the third beam L3 from the reflective area R1 of the wavelength conversion element 202, and the fourth reflective portion P4 of the light combining element 203e is configured to reflect the fourth beam L4 from the reflective area R1 of the wavelength conversion element 202. In the abovementioned embodiment, when the reflective area R1 of the wavelength conversion element 202 is cut into the transmission paths of the first beam L1, the second beam L2, the third beam L3 and the fourth beam L4, the first light emitting element E1, a second light emitting element E2, a third light emitting element E3 and a fourth light emitting element E4 emit the first beam L1, the second beam L2, the third beam L3 and the fourth beam L4 respectively. Meanwhile, the first auxiliary light emitting element AE1, the second auxiliary light emitting element AE2, the third auxiliary light emitting element AE3 and the fourth auxiliary light emitting element AE4 emit the first auxiliary beam La1, the second auxiliary beam La2, the third auxiliary beam La3 and the fourth auxiliary beam La4.

As shown in FIG. 12, a first light emitting element E1, a second light emitting element E2, a third light emitting element E3 and a fourth light emitting element E4 dispose at one side of the light combining element 203e, the first auxiliary light emitting element AE1, the second auxiliary light emitting element AE2, the third auxiliary light emitting element AE3 and the fourth auxiliary light emitting element AE4 dispose at the same side.

Figure 13:
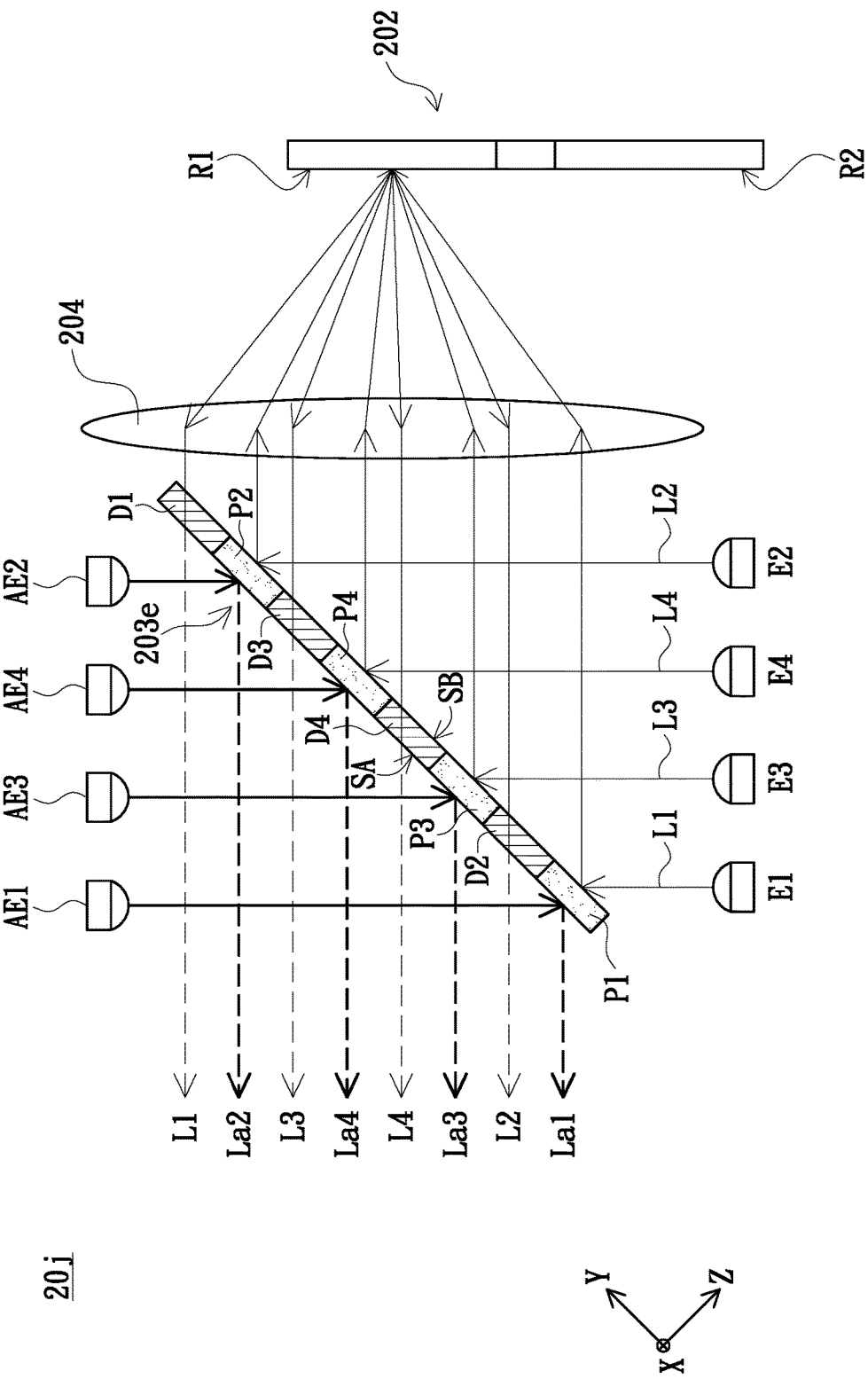
FIG. 13 is a schematic structural view of an illumination system in accordance with another embodiment of the invention.

FIG. 13 is a schematic structural view of an illumination system in accordance with another embodiment of the invention. As shown in FIG. 13, the illumination system 20j of the embodiment is part similar to the illumination system shown in FIGS. 8A, 8B and 12. The illumination system 20j of the embodiment includes a first light emitting element E1, a second light emitting element E2, a third light emitting element E3 and a fourth light emitting element E4, and the light combining element 203e further includes a first dichroic portion D1, a second dichroic portion D2, a third dichroic portion D3, a fourth dichroic portion D4, a first reflective portion P1, a second reflective portion P2, a third reflective portion P3 and a fourth reflective portion P4. In the embodiment, the first light emitting element E1 is configured to emit a first beam L1, the second light emitting element E2 is configured to emit a second beam L2, the third light emitting element E3 is configured to emit a third beam L3, the fourth light emitting element E4 is configured to emit a fourth beam L4.

Additionally, the illumination system 20j further comprises the first auxiliary light emitting element AE1, the second auxiliary light emitting element AE2, the third auxiliary light emitting element AE3 and the fourth auxiliary light emitting element AE4. In the embodiment, the first auxiliary light emitting element AE1 is configured to emit the first auxiliary beam La1. The second auxiliary light emitting element AE2 is configured to emit the second auxiliary beam La2. The third auxiliary light emitting element AE3 is configured to emit the third auxiliary beam La3. The fourth auxiliary light emitting element AE4 is configured to emit the fourth auxiliary beam La4.

In the embodiment, the first auxiliary beam La1 is reflected by the first reflective portion P1 of the light combining element 203e. The second auxiliary beam La2 is reflected by the second reflective portion P2 of the light combining element 203e. The third auxiliary beam La3 is reflected by the third reflective portion P3 of the light combining element 203e. The fourth auxiliary beam La4 is reflected by the fourth reflective portion P3 of the light combining element 203e.

In the embodiment, when the reflective area R1 of the wavelength conversion element 202 is cut into the transmission paths of the first beam L1, the second beam L2, the third beam L3 and the fourth beam L4. The first beam L1, the second beam L2, the third beam L3 and the fourth beam L4 are respectively reflected by the first reflective portion P1, the second reflective portion P2, the third reflective portion P3 and the fourth reflective portion P4 of the light combining element 203e to transmit to the reflective area R1 of the wavelength conversion element 202. Due to the reflective area R1 of the wavelength conversion element 202 is configured to reflect the first beam L1, the second beam L2, the third beam L3 and the fourth beam L4, the first beam L1, the second beam L2, the third beam L3 and the fourth beam L4 respectively penetrate through the first dichroic portion D1, the second dichroic portion D2, the third dichroic portion D3 and the fourth dichroic portion D4 of the light combining element 203e.

In the abovementioned embodiment, when the reflective area R1 of the wavelength conversion element 202 is cut into the transmission paths of the first beam L1, the second beam L2, the third beam L3 and the fourth beam L4, the first light emitting element E1, a second light emitting element E2, a third light emitting element E3 and a fourth light emitting element E4 emit the first beam L1, the second beam L2, the third beam L3 and the fourth beam L4 respectively. Meanwhile, the first auxiliary light emitting element AE1, the second auxiliary light emitting element AE2, the third auxiliary light emitting element AE3 and the fourth auxiliary light emitting element AE4 emit the first auxiliary beam La1, the second auxiliary beam La2, the third auxiliary beam La3 and the fourth auxiliary beam La4.

As shown in FIG. 13, a first light emitting element E1, a second light emitting element E2, a third light emitting element E3 and a fourth light emitting element E4 dispose at one side of the light combining element 203e, the first auxiliary light emitting element AE1, the second auxiliary light emitting element AE2, the third auxiliary light emitting element AE3 and the fourth auxiliary light emitting element AE4 dispose at the opposite side of the the light combining element 203e.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projector, comprising:
 an illumination system, comprising:
  an excitation light source group, comprising at least one first light emitting element, wherein the first light emitting element is configured to provide a first beam;
  a wavelength conversion element, having a reflective area and a wavelength conversion area, wherein the reflective area and the wavelength conversion area are configured to cut into a transmission path of the first beam by turns; and
  a light combining element, disposed between the excitation light source group and the wavelength conversion element and having at least one first dichroic portion, at least one first reflective portion, and a first light combining surface facing the first light emitting element, wherein the first dichroic portion corresponds to a first quadrant of the first light combining surface and the first reflective portion corresponds to a third quadrant of the first light combining surface, wherein the first beam is configured to penetrate through the first dichroic portion and to be transmitted to the wavelength conversion element, wherein the reflective area is configured to reflect the first beam to the first reflective portion, wherein the wavelength conversion area is configured to convert the first beam into an excited beam and reflect the excited beam to the light combining element, wherein the first dichroic portion and the first reflective portion of the light combining element are configured to reflect the excited beam, and the first reflective portion of the light combining element is configured to reflect the first beam from the reflective area, so that the first beam and the excited beam constitute an illumination beam;

a light engine module, comprising a light valve, wherein the light valve is located on a transmission path of the illumination beam and is configured to convert the illumination beam into an image beam; and a projection lens, located on a transmission path of the image beam, wherein the image beam becomes a projection beam after passing through the projection lens.

2. The projector according to claim 1, wherein the excitation light source group further comprises at least one second light emitting element, the second light emitting element is configured to provide a second beam, the light combining element further comprises at least one second dichroic portion and at least one second reflective portion, the second dichroic portion corresponds to the third quadrant of the first light combining surface, and the second reflective portion corresponds to the first quadrant of the first light combining surface, wherein the second beam is configured to penetrate through the second dichroic portion and to be transmitted to the wavelength conversion element, wherein the reflective area is configured to reflect the second beam to the second reflective portion, wherein the wavelength conversion area is configured to convert the second beam into the excited beam and reflect the excited beam to the light combining element, wherein the second dichroic portion and the second reflective portion of the light combining element are configured to reflect the excited beam, and the second reflective portion of the light combining element is configured to reflect the second beam from the reflective area, so that the first beam, the second beam and the excited beam constitute the illumination beam.

3. The projector according to claim 2, wherein the excitation light source group further comprises at least one auxiliary light emitting element, the auxiliary light emitting element is disposed between the first light emitting element and the second light emitting element, the auxiliary light emitting element is configured to provide an auxiliary beam, the light combining element further comprises at least one third dichroic portion and at least one third reflective portion, and the third dichroic portion is located between the third reflective portion and the second reflective portions, wherein the auxiliary beam is configured to penetrate through the third dichroic portion and to be transmitted to the wavelength conversion element, and the wavelength conversion element is configured to reflect the auxiliary beam to the third reflective portion, wherein the third reflective portion is configured to reflect the auxiliary beam from the wavelength conversion element, so that the auxiliary beam, the first beam, the second beam and the excited beam constitute the illumination beam.

4. The projector according to claim 1, wherein the illumination system further comprises an auxiliary light source group, the auxiliary light source group is disposed on one side of the excitation light source group, the auxiliary light source group is configured to provide at least one auxiliary beam, and the auxiliary beam penetrates through the corresponding first dichroic portion.

5. The projector according to claim 1, wherein the reflective area of the wavelength conversion element is a metal element.

6. The projector according to claim 1, wherein the reflective area of the wavelength conversion element comprises a glass element and a reflective film layer, the glass element has a first surface and a second surface, the first surface faces the light combining element, the second surface is opposite to the first surface, and the reflective film layer is disposed on the first surface or the second surface.

7. The projector according to claim 1, wherein the reflective area of the wavelength conversion element comprises a glass element, a reflective film layer and a diffusion structure, the glass element has a first surface and a second surface, the first surface faces the light combining element, the second surface is opposite to the first surface, the diffusion structure is disposed on the first surface, and the reflective film layer is disposed on the second surface.

8. The projector according to claim 1, wherein the reflective area of the wavelength conversion element has a reflective surface and a plurality of wavelength conversion substances, and the wavelength conversion substances are distributed on the reflective surface of the reflective area.

9. The projector according to claim 1, wherein the light combining element further comprises a diffusion structure, the diffusion structure is disposed on at least one of the first dichroic portion and the first reflective portion.

10. The projector according to claim 1, wherein the excitation light source group further comprises a lens group, the lens group is located between the light combining element and the wavelength conversion element, the lens group is located on a transmission path of the first beam from the light combining element to transmit the first beam to the wavelength conversion element, and the lens group is located on transmission paths of the excited beam and the first beam from the wavelength conversion element to transmit the excited beam and the first beam to the light combining element.

11. An illumination system, comprising:
an excitation light source group, comprising at least one first light emitting element, wherein the first light emitting element is configured to provide a first beam;

a wavelength conversion element, having a reflective area and a wavelength conversion area, wherein the reflective area and the wavelength conversion area are configured to cut into a transmission path of the first beam by turns; and a light combining element, disposed between the excitation light source group and the wavelength conversion element and having at least one first dichroic portion, at least one first reflective portion, and a first light combining surface facing the first light emitting element, wherein the first dichroic portion corresponds to a first quadrant of the first light combining surface and the first reflective portion corresponds to a third quadrant of the first light combining surface, wherein the first beam is configured to penetrate through the first dichroic portion and to be transmitted to the wavelength conversion element, wherein the reflective area is configured to reflect the first beam to the first reflective portion, wherein the wavelength conversion area is configured to convert the first beam into an excited beam and reflect the excited beam to the light combining element, wherein the first dichroic portion and the first reflective portion of the light combining element are configured to reflect the excited beam, and the first reflective portion of the light combining element is configured to reflect the first beam from the reflective area, so that the excited beam and the first beam constitute an illumination beam.

12. The illumination system according to claim 11, wherein the excitation light source group further comprises at least one second light emitting element, the second light emitting element is configured to provide a second beam, the light combining element further comprises at least one second dichroic portion and at least one second reflective portion, the second dichroic portion corresponds to the third quadrant of the first light combining surface, and the second reflective portion corresponds to the first quadrant of the first light combining surface, wherein the second beam is configured to penetrate through the second dichroic portion and to be transmitted to the wavelength conversion element, wherein the reflective area is configured to reflect the second beam to the second reflective portion, wherein the wavelength conversion area is configured to convert the second beam into the excited beam and reflect the excited beam to the light combining element, wherein the second dichroic portion and the second reflective portion of the light combining element are configured to reflect the excited beam, and the second reflective portion of the light combining element is configured to reflect the second beam from the reflective area, so that the first beam, the second beam and the excited beam constitute the illumination beam.

13. The illumination system according to claim 12, wherein the excitation light source group further comprises at least one auxiliary light emitting element, the auxiliary light emitting element is disposed between the first light emitting element and the second light emitting element, the auxiliary light emitting element is configured to provide an auxiliary beam, the light combining element further comprises at least one third dichroic portion and at least one third reflective portion, and the third dichroic portion is located between the third reflective portion and the second reflective portions, wherein the auxiliary beam is configured to penetrate through the third dichroic portion and to be transmitted to the wavelength conversion element, and the wavelength conversion element is configured to reflect the auxiliary beam to the third reflective portion, wherein the third reflective portion is configured to reflect the auxiliary beam from the wavelength conversion element, so that the auxiliary beam, the first beam, the second beam and the excited beam constitute the illumination beam.

14. The illumination system according to claim 11, further comprising an auxiliary light source group, wherein the auxiliary light source group is disposed on one side of the excitation light source group, the auxiliary light source group is configured to provide at least one auxiliary beam, and the auxiliary beam penetrates through the corresponding first dichroic portion.

15. The illumination system according to claim 11, wherein the reflective area of the wavelength conversion element is a metal element.

16. The illumination system according to claim 11, wherein the reflective area of the wavelength conversion element comprises a glass element and a reflective film layer, the glass element has a first surface and a second surface, the first surface faces the light combining element, the second surface is opposite to the first surface, and the reflective film layer is disposed on the first surface or the second surface.

17. The illumination system according to claim 11, wherein the reflective area of the wavelength conversion element comprises a glass element, a reflective film layer and a diffusion structure, the glass element has a first surface and a second surface, the first surface faces the light combining element, the second surface is opposite to the first surface, the diffusion structure is disposed on the first surface, and the reflective film layer is disposed on the second surface.

18. The illumination system according to claim 11, wherein the reflective area of the wavelength conversion element has a reflective surface and a plurality of wavelength conversion substances, and the wavelength conversion substances are distributed on the reflective surface of the reflective area.

19. The illumination system according to claim 11, wherein the light combining element further comprises a diffusion structure, the diffusion structure is disposed on at least one of the first dichroic portion and the first reflective portion.

20. The illumination system according to claim 11, wherein the excitation light source group further comprises a lens group, the lens group is located between the light combining element and the wavelength conversion element, the lens group is located on a transmission path of the first beam from the light combining element to transmit the first beam to the wavelength conversion element, and the lens group is located on transmission paths of the excited beam and the first beam from the wavelength conversion element to transmit the excited beam and the first beam to the light combining element.

21. The illumination system according to claim 11, wherein the excitation light source group comprises a plurality of the light emitting elements and a plurality of auxiliary light emitting elements, the plurality of the light emitting elements dispose at one side of the light combining element, the plurality of auxiliary light emitting elements dispose at the same side of the the light combining element.

22. The illumination system according to claim 11, wherein the excitation light source group comprises a plurality of the light emitting elements and a plurality of auxiliary light emitting elements, the plurality of the light emitting elements dispose at one side of the light combining element, the plurality of auxiliary light emitting elements dispose at the opposite side of the the light combining element.

23. A projector, comprising:
an illumination system, comprising:

an excitation light source group, comprising at least one first light emitting element, wherein the first light emitting element is configured to provide a first beam;

a wavelength conversion element, having a reflective area and a wavelength conversion area, wherein the reflective area and the wavelength conversion area are configured to cut into a transmission path of the first beam by turns; and a light combining element, disposed between the excitation light source group and the wavelength conversion element and having at least one first dichroic portion, at least one first penetrating portion, and a first light combining surface facing the first light emitting element, wherein the first penetrating portion corresponds to a first quadrant of the first light combining surface and the first dichroic portion corresponds to a third quadrant of the first light combining surface, wherein the first beam is adapted to be reflected by the first dichroic portion to the wavelength conversion element, wherein the reflective area is adapted to reflect the first beam to the first penetrating portion, wherein the wavelength conversion area is adapted to convert the first beam into an excited beam and adapted to reflect the excited beam to the light combining element, wherein the first dichroic portion and the first penetrating portion of the light combining element are adapted to allow the excited beam to penetrate therethrough, the first penetrating portion is adapted to allow the first beam and the excited beam to penetrate through, so that the first beam and the excited beam constitute an illumination beam;

a light engine module, comprising a light valve, wherein the light valve is located on a transmission path of the illumination beam and is configured to convert the illumination beam into an image beam; and a projection lens, located on a transmission path of the image beam, wherein the image beam becomes a projection beam after passing through the projection lens.

* * * * *